US008538472B2

United States Patent
Dawid et al.

(10) Patent No.: US 8,538,472 B2
(45) Date of Patent: Sep. 17, 2013

(54) USER EQUIPMENT AND METHOD FOR PERFORMING DOWNLINK AND/OR UPLINK POWER CONTROL

(75) Inventors: Herbert Dawid, Herzogenrath (DE); Thorsten Clevorn, Duesseldorf (DE); Edgar Bolinth, Korschenbroich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 270 days.

(21) Appl. No.: 12/967,180

(22) Filed: Dec. 14, 2010

(65) Prior Publication Data

US 2012/0149424 A1 Jun. 14, 2012

(51) Int. Cl.
*H04W 52/08* (2009.01)
*H04B 7/00* (2006.01)

(52) U.S. Cl.
USPC ........ 455/522; 455/69; 455/67.13; 455/277.2

(58) Field of Classification Search
USPC .............. 455/522, 69, 66.1, 62, 452.2, 67.13, 455/550.1, 562.1, 277.1, 277.2, 63.1
See application file for complete search history.

(56) References Cited

U.S. PATENT DOCUMENTS

| 6,070,086 A | 5/2000 | Dobrica |
| 6,144,861 A * | 11/2000 | Sundelin et al. ............. 455/522 |
| 6,904,290 B1 | 6/2005 | Palenius |
| 7,437,175 B2 | 10/2008 | Lindoff et al. |
| 2006/0246937 A1 | 11/2006 | Lindoff |
| 2006/0252447 A1 | 11/2006 | Muharemovic et al. |
| 2008/0051046 A1 * | 2/2008 | Ruckriem ..................... 455/132 |
| 2008/0214224 A1 | 9/2008 | Ostman et al. |
| 2008/0220819 A1 * | 9/2008 | Ben-Eli ......................... 455/561 |
| 2009/0086682 A1 | 4/2009 | Kazmi et al. |

FOREIGN PATENT DOCUMENTS

| EP | 1216522 B1 | 6/2002 |
| WO | 9952226 A1 | 10/1999 |
| WO | 2007074285 A1 | 7/2007 |

OTHER PUBLICATIONS

3GPP TS 25.101 V7.16.0. "3rd Generation Partnership Project; Technical Specification Group Radio Access Network; User Equipment (UE) Radio Transmission and Reception (FDD) (Release 7)." 32 Pages.
3 GPP TS 25.214 V7.15.0. "3rd Generation Partnership Project; Technical Specification Group Radio Access Network; Physical Layer Procedures (FDD) (Release 7)." 44 Pages.
3 GPP TS 34.121-1 V7.6.0. "3rd Generation Partnership Project; Technical Specification Group Radio Access Network; User Equipment (UE) Conformance Specification; Radio Transmission and Reception (FDD); Part 1: Conformance Specification (Release 7)." 7 Pages.

(Continued)

*Primary Examiner* — John J Lee
(74) *Attorney, Agent, or Firm* — Eschweiler & Associates, LLC

(57) ABSTRACT

A user equipment includes a plurality of antennas to receive downlink signals from a base station, a plurality of receiver circuits each coupled to a respective one of the plurality of antennas to process the received downlink signals, an SIR estimation unit to estimate a quality of the received downlink signals, a power loop controller to generate transmit power control commands based on the estimated quality of the received downlink signals, the transmit power control commands being directed to the base station to adjust a power of the downlink signals and a diversity controller to selectively activate and deactivate one or more of the receiver circuits depending on the estimated quality of the received downlink signals.

21 Claims, 13 Drawing Sheets

(56) References Cited

OTHER PUBLICATIONS

3 GPP TS 34.121-1 V8.9.0. "3rd Generation Partnership Project; Technical Specification Group Radio Access Network; User Equipment (UE) Conformance Specification; Radio Transmission and Reception (FDD); Part 1: Conformance Specification (Release 8)." 23 Pages.

U.S. Appl. No. 12/967,180, filed Dec. 14, 2010.
U.S. Appl. No. 13/423,719, filed Mar. 19, 2012.

* cited by examiner

USER EQUIPMENT AND METHOD FOR PERFORMING DOWNLINK AND/OR UPLINK POWER CONTROL

FIELD

This invention relates to a user equipment (UE) performing downlink power control (DLPC), a user equipment performing uplink power control (ULPC), a method for downlink power control of a user equipment, and a method for uplink power control of a user equipment.

BACKGROUND

In mobile communications between a base station (BS) and a user equipment (UE), diversity receivers are used in the user equipment to improve the reception of radio signals sent by the base station. The diversity receivers improve the quality of the received signal. The use of receive diversity, however, leads to significantly increased power consumption, considerably reducing the available talk times. Therefore, there is a need to provide a user equipment that efficiently uses battery power to provide high talk times at high signal quality.

In 3GPP ($3^{rd}$ Generation Partnership Project) standardization, performance requirements are specified for reception of the DPCH (dedicated physical channel) fulfilling the so called "Enhanced Performance Requirements Type 1". These Type 1 requirements refer to user equipments using receive diversity (RxDiv, two or more receive antennas) according to 3GPP Technical Specification TS 25.101 V7.16.0 (2009-05), Section 8.3, 8.6, 8.8. In order to fulfill these requirements it is necessary according to 3GPP to operate the RxDiv receiver all the time in RxDiv mode, i.e. with both antennas being activated and with the full receive diversity receiver being activated. The frequency of occurrence of call drops which is one of the major quality criteria used for finally deployed devices used by network (NW) operators and handset vendors will be significantly reduced when RxDiv is used because RxDiv provides a considerable SNR gain, e.g. 3 dB minimum without fading and without antenna correlation and even larger gains with fading and without antenna correlation. On the other hand, the usage of RxDiv, however, leads to significantly increased current consumption, reducing the talk time considerably.

For these and other reasons there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
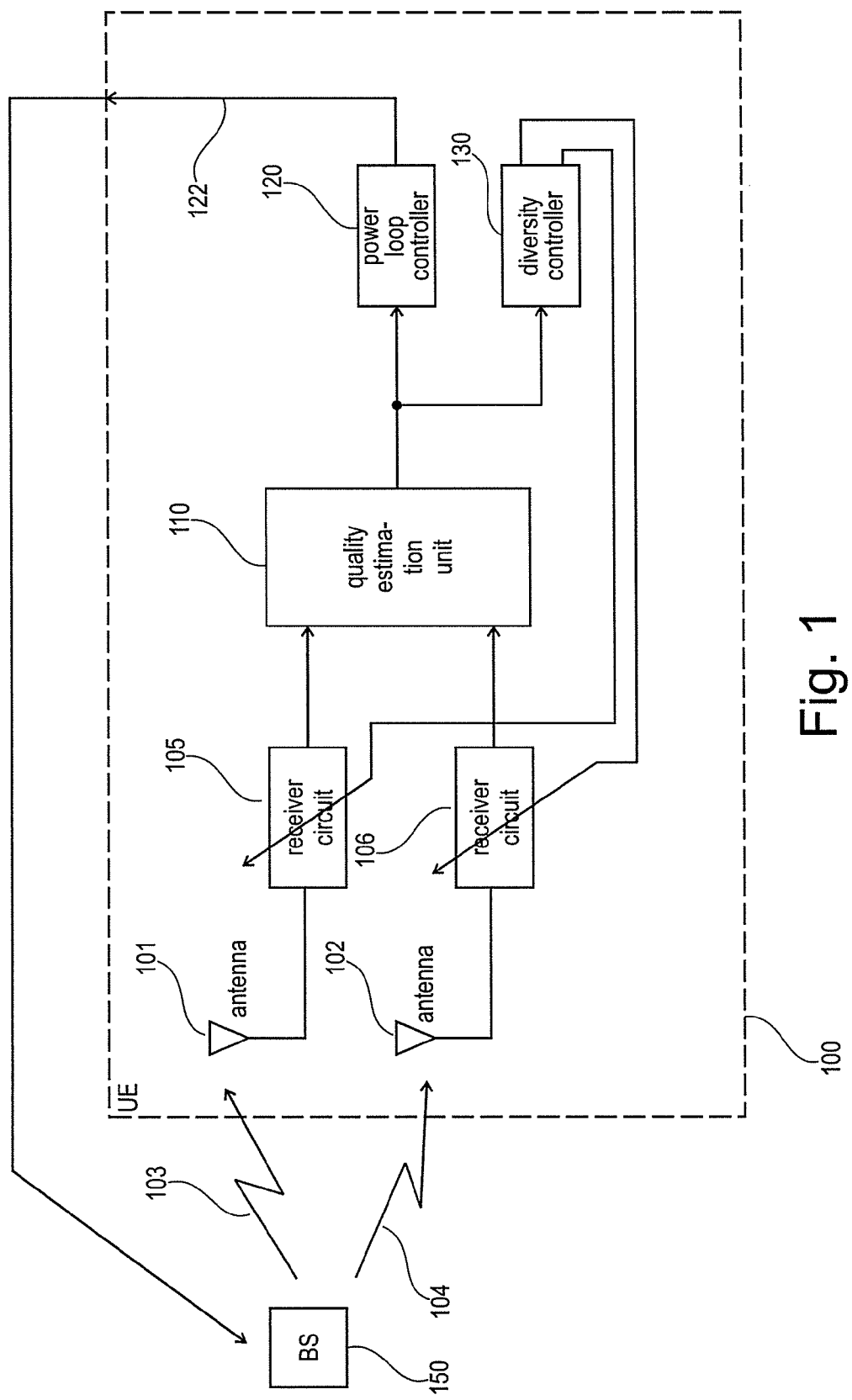
FIG. 1 schematically illustrates a user equipment according to one embodiment.

In the following detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

As employed in this Specification, the terms "coupled" and/or "electrically coupled" are not meant to mean that the elements must be directly coupled together; intervening elements may be provided between the "coupled" or "electrically coupled" elements.

User equipments, i.e. devices which include antennas, receiver circuits, transmitters and power loop controllers and which may include signal-to-interference-ratio (SIR) estimation units, diversity controllers and TPC quality estimators are described below.

Antennas are transducers that transmit or receive electromagnetic waves. In other words, antennas convert electromagnetic radiation into electrical current, or vice versa. Antennas generally deal in the transmission and reception of radio waves. Antennas are used in systems such as radio communications, wireless LAN, cell phones and mobile communications.

Antennas in the user equipment receive downlink radio signals from a base station and convert these signals into electrical signals which are the received downlink signals.

Radio signals are radio frequency signals that are radiated by a radio transmitter (sender) with a radio frequency (RF) in the range of about 3 Hz to 300 GHz. This range corresponds to the frequency of alternating current electrical signals used to produce and detect radio waves. RF usually refers to oscillations in electrical circuits.

The use of multiple antennas in a user equipment results in improved overall system performance due to the use of diversity techniques. Receiver diversity (RxDiv) or antenna diversity, also known as space diversity, is any one of several wireless diversity schemes that use two or more antennas to improve the quality and reliability of a wireless link. Often, especially in urban and indoor environments, there is not a clear line-of sight (LOS) between transmitter and receiver. Instead the signal is reflected along multiple paths before finally being received. Each of these bounces can introduce phase shifts, time delays, attenuations, and even distortions that can destructively interfere with one another at the aperture of the receiving antenna. Antenna diversity is especially effective at mitigating these multipath situations. This is because multiple antennas offer a receiver several observations of the same signal. Each antenna will experience a different interference environment. Thus, if one antenna is experiencing a deep fade, it is likely that another has a sufficient signal. Collectively such a system can provide a robust link. While this is primarily seen in receiving systems (Receiver Diversity), the analog has also proven valuable for transmitting systems (Transmitter Diversity) as well. The use of multiple antennas at both transmit and receive results in a multiple-input multiple-output (MIMO) system. The use of diversity techniques at both ends of the link is termed space-time coding.

Receiver circuits are coupled to a respective antenna in order to process the received downlink signal of the antenna. Receiver circuits may include Rake receivers and/or equalizers or other suitable receivers.

Downlink signals are signals transmitted in downlink direction, i.e. from a base station to a user equipment. Downlink signals carry downlink channels. In WCDMA a user terminal may be allocated one or more Physical Data Channels (PDCHs) or Dedicated Physical Data Channels (DP-DCHs) which carry user bits. A user terminal may also be allocated a Physical Control Channel (PCCH) or a Dedicated Physical Control Channel (DPCCH) on which overhead control information is carried to the user, e.g. bit rate information of the associated PDCHs, transmit power control bits and pilot symbols, which can be used to perform the SIR measurements in the fast power control loop process. A Dedicated Physical Channel (DPCH) includes Dedicated Physical Data Channels (DPDCHs) and a Dedicated Physical Control Channel (DPCCH). A user terminal may also be allocated an F-DPCH (fractional DPCH) channel which carries only transmit power control bits. In case of F-DPCH, the received transmit power control symbols must be used to perform quality estimation required for the fast power control loop process.

Rakes are rake receivers or generalized-rake (G-Rake) receivers which exploit multi-path information of the received radio signal. A rake can be utilized to counter the effects of multipath fading. This can be achieved by using several sub-equalizers or "fingers", that is, several correlators each assigned to a different multi-path component. Each finger independently equalizes a single multi-path component, and at a later stage the contribution of some or all fingers are combined in order to make use of the different transmission characteristics of each transmission path. This results is a higher signal-to-noise ratio in a multi-path environment. By using rakes, different paths with different delays can be effectively combined to obtain the path diversity gain. Due to narrow transmission pulses and a large transmission bandwidth of the radio channel, the resulting inter-symbol interference (ISI) and a long delay spread in the characterization of the radio channel may be overcome by using the rake. A rake output signal is provided at an output of the rake.

Equalizers equalize effects of the radio channel on the received radio signal, such as delay or multipath fading by applying the inverse channel impulse response to the received signal in order to reconstruct the original transmitted signal. The inverse of the channel impulse response may be stored in an array, e.g. forming an FIR filter and may be updated by an adaptive algorithm. An estimation of the transmitted signal is provided as equalized signal at an output of the equalizer.

Receiver circuits may include mixers for mixing the received signals down to baseband, demodulators for demodulating the received signals and decoders for decoding the received signals. Demodulation is the inverse operation of modulation which is performed in the base station transmitter, e.g. a UMTS transmitter. By way of example, the modulation scheme (constellation) in UMTS transmitters is quadrature phase shift keying (QPSK) or quadrature amplitude modulation, e.g. 16QAM or 256QAM. Modulation is a process where the transmitted symbols are multiplied with the carrier signal obtaining a signal to be transmitted. Demodulation is the inverse process multiplying the received signal with the carrier signal to obtain the original transmitted symbols. The modulating symbols are called chips, and their modulating rate may, for example, be 3.84 Mcps.

Transmitters in the user equipment are transmission circuits used for transmission of the uplink signal to the base station. Uplink signals are signals transmitted in uplink direction, i.e. from a user equipment to a base station. The transmitter may transmit uplink signals at different power levels which power levels may be adjusted by a power loop controller. The transmitter is able to shut power off and to turn power on. The transmitter may use a transmission antenna or an array of transmission antennas for transmitting the uplink signal to the base station.

Signal-to-interference-plus-noise-ratio (SIR) estimation units (sometimes also called SINR) perform estimation of SIR values of the downlink signals after demodulation. The signal-to-interference-plus-noise ratio (SIR) is the quotient between the average received modulated signal power and the sum of the average received interference power and the received noise. The interference power may be generated by other transmitters than the useful signal. Interference is anything which alters, modifies, or disrupts a signal as it travels along a channel between a source and a receiver. In Wideband CDMA systems, this kind of interference is frequently called other-cell interference. Additionally, there is own-cell interference or inter-path interference. In a frequency selective transmission channel, the signal travels from the transmitter to the receiver along different transmission paths which are characterized by different propagation delays and uncorrelated fading. These multiple transmission paths interfere with each other, hence the resulting interference is called inter-path interference.

Power loop controllers are controllers for performing uplink and/or downlink power control. For uplink power control (ULPC) power loop controllers may adjust a power of the uplink signals directed to a base station based on transmit power control (TPC) commands included in downlink signals from the base station. For downlink power control (DLPC) power loop controllers may generate transmit power control (TPC) commands based on quality estimates (e.g. estimated SIR values) of downlink signals and transmit these TPC commands to the base station to request the base station adjusting a power of the downlink signals.

Power control (PC) is an essential function of cellular CDMA systems. WCDMA is the third generation cellular system (3G) of the 3GPP ($3^{rd}$ Generation Partnership Project) forum. For WCDMA, power control is defined for the FDD (Frequency Division Duplex) system and for the TDD (Time Division Duplex) system.

The WCDMA air interface is organized in frames of 10 ms duration. A frame contains 15 time slots and each slot includes one power control (PC) command (up or down), which gives a PC update rate of 1500 Hz. The transmitted power has a fixed value during a given time slot. Power control in WCDMA for DPCH channels is a closed-loop PC which is a combination of outer and inner closed loop control. Power control for the WCDMA may be performed in the power loop controller. The inner (also called fast) closed loop PC adjusts the transmitted power of the downlink channel in order to keep the received SIR equal to a given target. This SIR target is fixed according to the received BLER (Block Error Rate) or BER (Bit Error Rate). The setting of the SIR target ($SIR_{target}$) is done by the outer loop PC, which is part of the Radio Resource Control Layer, in order to match the required BLER. Outer loop PC update frequency is about 10-100 Hz. The BLER target is a function of the service that is carried. Ensuring that the lowest possible SIR target is used results in greater network capacity. The inner closed-loop PC of the user equipment measures the received quality on the downlink channel based on the received SIR and sends transmit power control (TPC) commands on an uplink channel to the base station in order to request power update of the downlink channel. For F-DPCH channels, the NW sets a quality target for the F-DPCH. The UE autonomously sets a SIR target value and adjusts it in order to achieve the same quality as the quality target set by NW. The quality target is set as a downlink TPC command error rate target value for the F-DPCH belonging to the radio link from the HS-DSCH serving cell as signaled by the UTRAN. Hence, for F-DPCH, the TPC command error rate target replaces the BLER target used for DPCH channels. This is required since the F-DPCH channels do not contain any user data which could be used for a BLER measurement.

SIR estimation is performed by an SIR estimation unit which may be an electrical circuit for estimation of SIR. The SIR estimation unit estimates the received power of the downlink channel to be power controlled and the received interference and noise on this downlink channel. For DPCH channels, the signal power and the interference and noise power may be estimated by using pilot symbols, i.e., known symbols transmitted on one or more downlink channels. For F-DPCH channels, quality estimation has to be performed on the TPC symbols. The obtained SIR estimate, noted $SIR_{est}$, or TPC quality estimate in case of F-DPCH, may then be used by the power loop controller to generate PC commands which may be according to DPC Mode 0 or 1 of the 3GPP specification.

With DPC Mode 0 of 3GPP TS 25.214 V7.15.0 (2010-03), the transmitted power is updated at each time slot (10/15 ms). It is increased or decreased by a fixed value: if $SIR_{est} > SIR_{target}$, then the TPC command to transmit is "0", requesting a transmit power decrease; if $SIR_{est} < SIR_{target}$, then the TPC command to transmit is "1", requesting a transmit power increase. DPC Mode 1 of 3GPP TS 25.214 V7.15.0 (2010-03) is a slight variant of DPC Mode 0 where the transmitted powers may be updated each three time slots, which simulates smaller power update steps. The power control step size is a parameter of the fast (inner) closed-loop PC which may be implemented on the power loop controller. It is equal to 0.5, 1, 1.5 or 2 dB. The power update step size may be chosen according to the average mobile speed and other operating environment parameters.

Quality estimators are estimation devices for estimating a quality measure of a signal, in particular a quality of transmit power control commands included in the downlink signals. The quality measure may be a signal-to-noise ratio (SNR), a signal-to-interference-plus-noise ratio (SIR), an absolute power of the downlink signal measured at the user equipment, an error rate or any other quality measure. The quality estimator may monitor TPC commands in the received downlink signal over a specified time interval in order to estimate a quality measure. A valid TPC command is one command which is generated at the base station in response to the SIR measured from the last uplink signal received from the user equipment, and that is transmitted in the downlink signal at a power level responsive to the TPC commands in the last uplink signal received from the user equipment.

The quality measure may be used for "Out-of-Sync" detection between base station and user equipment. For example, if the user equipment receives the downlink signal and determines that, e.g., the TPC command error rate exceeds some threshold $Q_{out}$, e.g. 30% over a measurement interval of 240 slots (or 160 ms) according to 3GPP, it may detect "Out-of-Sync". If the user equipment determines that the TPC command error rate is less than a threshold $Q_{in}$, e.g. less than 20% over a measurement interval of 240 slots (or 160 ms) according to 3GPP, it may conclude that it is "In-Sync". Upon an "Out-of-Sync" detection the user equipment may turn its transmitter off. Upon an "In-Sync" detection the user equipment may turn its transmitter on again. Switching on and off the transmitter may be under the control of the power loop controller.

Diversity controllers are used to control diversity receivers including receiver circuits. Diversity receivers enhance reliability by minimizing the channel fluctuations due to fading. The central idea in diversity is that different antennas receive different versions of the same signal. The chances of all these copies being in a deep fade is small. These schemes therefore make most sense when the fading is independent from element to element and are of limited use (beyond increasing the SNR) if perfectly correlated (such as in line-of-sight conditions). Independent fading would arise, for example, in a dense urban environment where the several multipath components add up very differently at each element.

Fading may be modeled as having three components which are path loss, large-scale and small-scale fading. Over fairly long periods the first two components are approximately constant and can be dealt with using power control. Furthermore, these components of fading are very close to being constant across all elements of the array (perfectly correlated). Diversity combining is specifically targeted to counteract small scale fading, e.g. Rayleigh fading. According to the physical model, fading is assumed to be independent from one element to the next. Diversity "works" because for N elements in the receiving antenna array N independent copies of the same signal are received by the diversity receiver. It is unlikely that all N elements are in a deep fade. If at least one copy has reasonable power, one should conceivably be able to adequately process the signal.

Each receiver element of a diversity receiver, therefore, receives an independent sample of the random fading process, i.e., an independent copy of the transmitted signal. In the diversity receiver these independent samples are combined under control of the diversity controller in order to achieve the desired goal of increasing the SNR and reducing the BER.

The diversity controller may select individual receiver circuits in the diversity receiver for data processing. The diversity controller may control the way of combining these samples, for example selecting "Maximum Ratio Combining" (MRC), i.e. obtaining weights that maximize the output SNR, selecting "Selection Combining" (SC), i.e. choosing the element with the greatest SNR for further processing or selecting "Equal Gain Combining" (EGC), i.e. setting unit gain at each element. The diversity controller may further control the power of the diversity receiver by turning off receiver circuits which provide poor SNRs or BERs in order to save power and by turning on receiver circuits which provide good SNRs or BERs in order to improve the detection quality of the diversity receiver. The diversity controller may control the power switching of the receiver circuits depending on a quality measure of the quality estimator.

The devices described below may be designed for implementing the UMTS (Universal Mobile Telecommunications System) standard, e.g. one of the Release 99, 4, 5, 6, 7, 8 and 9 or higher versions of the UMTS standard. The devices may implement a HSPA (High Speed Packet Access) mobile telephony protocol, such as HSDPA (High Speed Downlink Packet Access) and HSUPA (High Speed Uplink Packet Access). The devices may implement the HSPA+ (Evolved HSPA) standard. The devices may be designed to implement the WCDMA (Wideband Code Division Multiple Access) standard. The devices may be designed to implement the LTE (Long Term Evolution) mobile communications standard, the E-UTRAN (Evolved Universal Terrestrial Radio Access Network) standard, the HSOPA (High Speed Orthogonal Frequency Division Multiplex Packet Access) standard or the Super 3G standard defined by 3GPP (Third Generation Partnership Project) standardization organization. Further the devices may be designed to implement WiMAX (Worldwide Interoperability for Microwave Access) according to the industrial consortium developing test strategies for interoperability or the IEEE (Institute of Electrical and Electronics Engineers) 802.16 (wireless MAN) and 802.11 (wireless LAN) standards. The devices described in the following may also be designed to implement other standards.

The devices may include integrated circuits and/or passives. The integrated circuits may be manufactured by different technologies and may, for example, be designed as logic integrated circuits, analog integrated circuits, mixed signal integrated circuits, memory circuits or integrated passives.

FIG. 1 schematically illustrates a user equipment 100 according to one embodiment, in particular a user equipment which is configured for performing Downlink Power Control (DLPC). The user equipment 100 includes a plurality of antennas, e.g. a first antenna 101 and a second antenna 102, to receive downlink signals, e.g. a first downlink signal 103 and a second downlink signal 104, from a base station 150. The user equipment 100 further contains a plurality of receiver circuits, e.g. a first receiver circuit 105 and a second receiver circuit 106; each of the receiver circuits is coupled to a respective one of the plurality of antennas. In the embodiment illustrated in FIG. 1, the first receiver circuit 105 is coupled to the first antenna 101, and the second receiver circuit 106 is coupled to the second antenna 102. The receiver circuits 105, 106 process the received downlink signals, i.e. the first receiver circuit 105 processes the first downlink signal 103, and the second receiver circuit 106 processes the second downlink signal 104.

The user equipment 100 further includes a quality estimation unit 110, which is configured to estimate the quality of the received downlink signals 103, 104. The estimation may be based on the SIR (signal-to-interference-plus-noise ratio) of pilot symbols included in the downlink signals 103, 104, and/or may be based on the quality of TPC symbols included in the downlink signals 103, 104. The quality estimation unit 110 may be coupled to some or all of the receiver circuits 105, 106 in order to estimate the quality based on output signals of the receiver circuits 105, 106. The quality estimation unit may, for example, estimate a quality value for each of the output signals of the receiver circuits 105, 106.

The user equipment 100 further includes a power loop controller 120 and a diversity controller 130. The power loop controller 120 is coupled to the quality estimation unit 110 and is configured to generate transmit power control (TPC) commands 122 based on the estimated quality estimated by the quality estimation unit 110. The transmit power control commands 122 are directed to the base station 150 in order to adjust the power of the downlink signals 103, 104.

The diversity controller 130 is coupled to the quality estimation unit 110 and is configured to selectively activate and/or deactivate at least one of the receiver circuits 105, 106 depending on the estimated quality values. Alternatively, at least one of the antennas 101, 102 may be activated and/or deactivated by the diversity controller 130 or both, antennas 101, 102 and corresponding receiver circuits 105, 106 may be activated.

Figure 2:
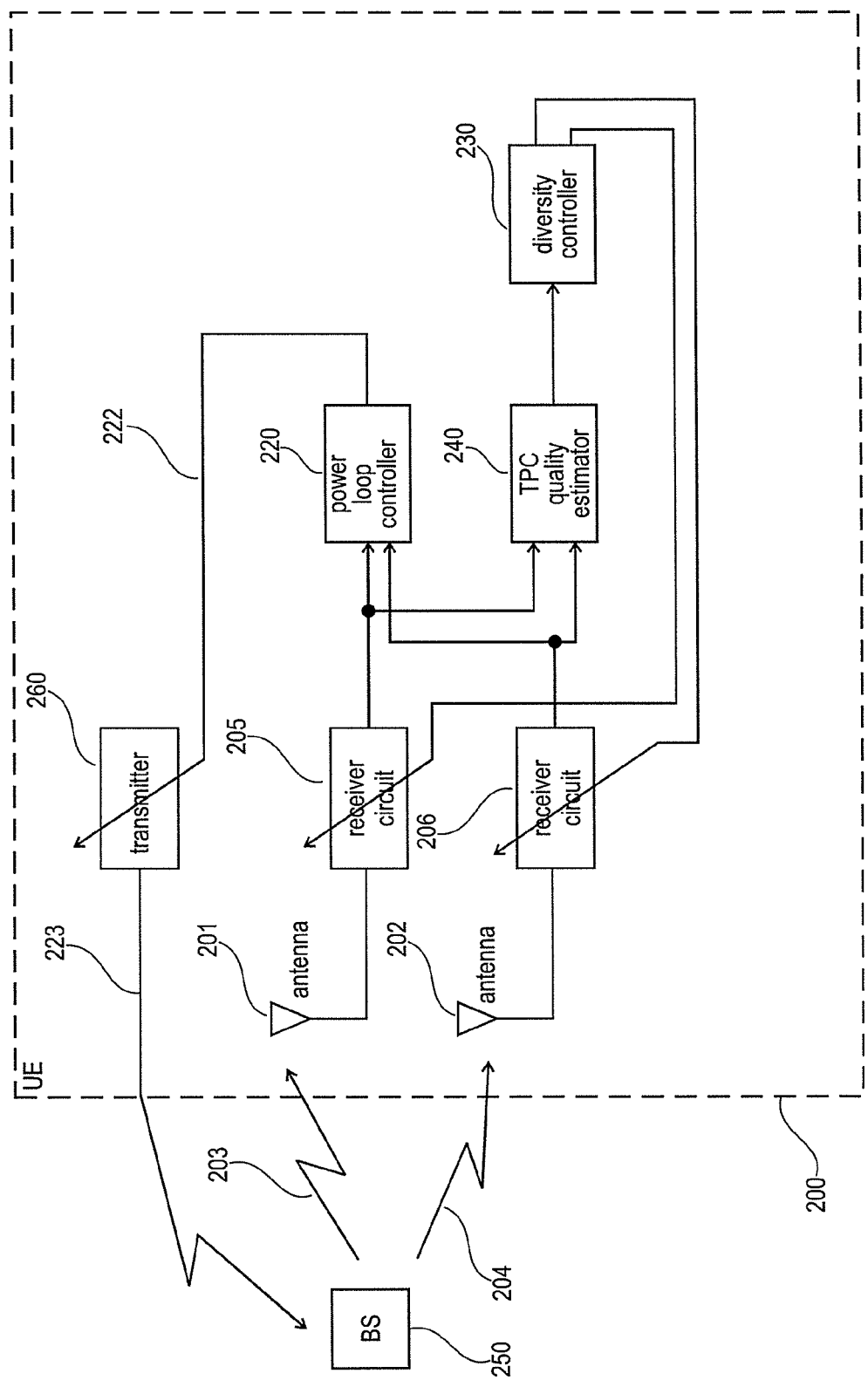
FIG. 2 schematically illustrates a user equipment according to one embodiment.

FIG. 2 schematically illustrates a user equipment 200 according to one embodiment, in particular a user equipment which is configured for performing Uplink Power Control (ULPC). The user equipment 200 includes a plurality of antennas, e.g. a first antenna 201 and a second antenna 202 to receive downlink signals, e.g. a first downlink signal 203 and a second downlink signal 204 from a base station 250. The user equipment 200 further includes a plurality of receiver circuits, e.g. a first receiver circuit 205 and a second receiver circuit 206; each of the receiver circuits is coupled to a respective one of the plurality of antennas. For example, the first receiver circuit 205 is coupled to the first antenna 201, and the second receiver circuit 206 is coupled to the second antenna 202. The receiver circuits 205, 206 process the received downlink signals, i.e. the first receiver circuit 205 processes the first downlink signal 203, and the second receiver circuit 206 processes the second downlink signal 204.

The plurality of antennas 201, 202 with corresponding receiver circuits 205, 206 for receiving the downlink signals 203, 204 from the base station 250 may correspond to the respective circuits 101, 102, 105, 106, 150 and signals 103, 104 as illustrated in FIG. 1.

The user equipment 200 further includes a power loop controller 220, a TPC quality estimator 240 and a diversity controller 230. The power loop controller 220 and the TPC quality estimator 240 are each coupled to the plurality of receiver circuits 205, 206 in order to receive the received downlink signals 203, 204. The diversity controller 230 is coupled to the TPC quality estimator 240.

The power loop controller 220 adjusts a power of the uplink signals 223 transmitted to the base station 250 by a transmitter 260 in the user equipment 200. The power loop controller 220 uses a power adjust signal 222 to adjust the power of the transmitter 260 based on transmit power control commands included in the downlink signals 203, 204.

The TPC quality estimator 240 estimates a quality measure of the transmit power control commands included in the downlink signals 203, 204. The quality measure may, for example, be a signal-to-noise ratio, a signal-to-interference-plus-noise ratio (SIR) or an error rate of the power control commands.

The diversity controller 230 is coupled to the TPC quality estimator 240 and is configured to selectively activate and/or deactivate at least one of the receiver circuits 205, 206 depending on the estimated quality measure. Alternatively, at least one of the antennas 201, 203 may be activated and/or deactivated by the diversity controller 230 or both, antennas 201, 202 and corresponding receiver circuits 205, 206 may be activated.

Depending on the estimated quality measure the power loop controller 220 may turn off the transmitter 260, e.g. when the quality measure falls below a first (lower) threshold, the power loop controller 220 may turn off the transmitter 260 in order to avoid the transmitter 260 from transmitting uplink signals 223 based on unsecure detected transmit power control commands in the downlink signals 203, 204. When the quality measure exceeds a second (higher) threshold, the power loop controller 220 may turn on the transmitter 260 again because a reliable quality measure indicates a reliable transmit power control command in the downlink signals 203, 204.

The power loop controller 220 may additionally have the functionality of the power loop controller 120 depicted in FIG. 1, and the user equipment 200 may additionally include the quality estimation unit 110 of FIG. 1. The diversity controller 230 may additionally have the functionality of the diversity controller 130 depicted in FIG. 1. The user equipment 200 of FIG. 2 and the user equipment 100 of FIG. 1 may be integrated in the same device.

Figure 3:
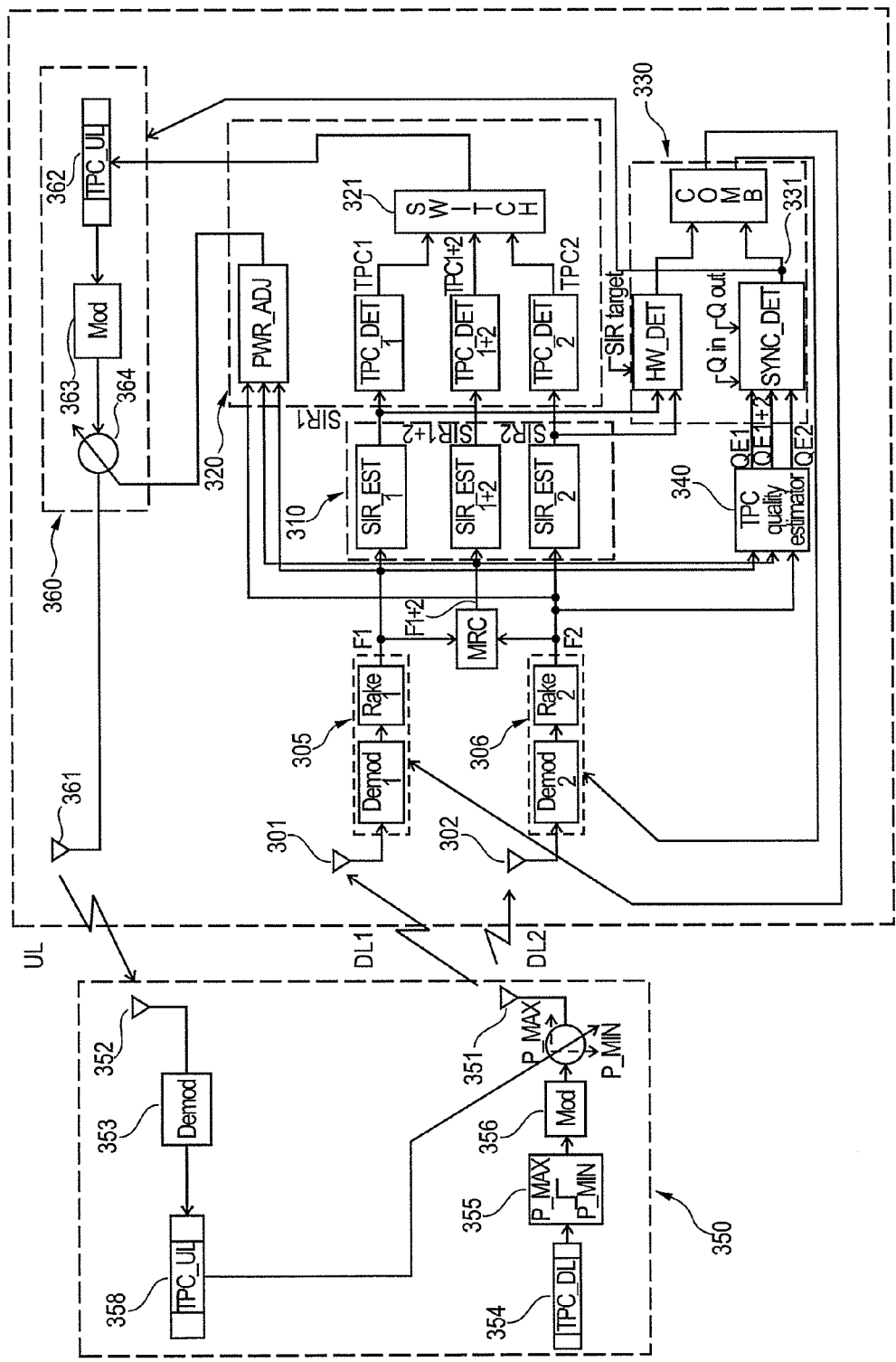
FIG. 3 schematically illustrates a power control system with a user equipment and a base station according to one embodiment.

FIG. 3 schematically illustrates a power control system with a user equipment 300 and a base station 350 according to one embodiment. The base station 350 transmits downlink signals DL1, DL2 by an antenna 351 to the user equipment 300. The user equipment 300 includes a plurality of antennas, e.g. a first antenna 301 and a second antenna 302 to receive the downlink signals, e.g. the first downlink signal DL1 and the second downlink signal DL2, from the base station 350.

The user equipment 300 further includes a plurality of receiver circuits, e.g. a first receiver circuit 305 and a second receiver circuit 306; each of the receiver circuits is coupled to a respective one of the plurality of antennas. For example, the first receiver circuit 305 is coupled to the first antenna 301, and the second receiver circuit 306 is coupled to the second antenna 302. The user equipment 300 includes a combiner (e.g. a Maximum Ratio Combiner MRC) coupled to the plurality of receiver circuits 305, 306, and combining the received signals from the plurality of receiver circuits, a quality estimation unit 310 (which may be realized as an SIR estimation unit) coupled to the plurality of receiver circuits 305, 306 and to the combiner MRC, a power loop controller 320 coupled to the plurality of receiver circuits 305, 306 and to the combiner MRC. The user equipment 300 includes a transmitter 360 coupled to the power loop controller 320, a quality estimator 340 coupled to the plurality of receiver circuits 305, 306, and to the combiner MRC, and a diversity controller 330 coupled to the SIR estimation unit 310 and to the TPC quality estimator 340.

The receiver circuits 305, 306 process the received downlink signals, i.e. the first receiver circuit 305 processes the first downlink signal DL1 and the second receiver circuit 306 processes the second downlink signal DL2.

Each of the receiver circuits 305, 306 includes a demodulator to demodulate the respective received downlink signal and a rake to detect multipath signals in the respective demodulated received downlink signal. The combiner combines the detected multipath signals F1 and F2 of the first 305 and second 306 receiver circuits in order to provide a combined multipath signal F1+2 which is a combination of the detected multipath signals F1, F2 of both receiver circuits 305, 306. The combined multipath signal F1+2 has an optimum signal-to-noise ratio. The detected multipath signals F1, F2 and the combined multipath signal F1+2 may be digital signals having a frame structure with a field of pilot symbols and/or a field of transmit power control commands (TPC).

The quality estimation unit 310 is configured to estimate the quality of the detected multipath signals F1, F2 and the combined multipath signal F1+2 via an SIR estimation. The quality estimation unit 310 may include three (or any other number of) SIR estimators. A first SIR estimator SIR_EST1 estimates a first SIR value SIR1 of the detected multipath signal F1, a second SIR estimator SIR_EST2 estimates a second SIR value SIR2 of the detected multipath signal F2, and a third SIR estimator SIR_EST1+2 estimates a third SIR value SIR1+2 of the combined multipath signal F1+2. The estimation may be based on pilot symbols and/or TPC symbols included in the multipath signals F1, F2 and F1+2. The user equipment 300 has a basic configuration of two antennas providing two multipath signals and one combined multipath signal. Higher configurations provide more signals to the SIR estimation unit 310. For example, a user equipment having three antennas may provide three multipath signals F1, F2, F3 and four combined multipath signals F1+2, F1+3, F2+3, F1+2+3 to the SIR estimation unit 310 which then may have seven SIR estimators.

The power loop controller 320 may include three TPC determinators TPC_DET1, TPC_DET2 and TPC_DET1+2 for the basic configuration of two antennas. Each of the three TPC determinators TPC_DET1, TPC_DET2 and TPC_DET1+2 is coupled to a respective SIR estimator SIR_EST1, SIR_EST2, SIR_EST1+2. The first TCP determinator TPC_DET1 determines a TPC command TPC1 based on the first SIR value SIR1. The second TCP determinator TPC_DET2 determines a TPC command TPC2 based on the second SIR value SIR2. The third TCP determinator TPC_DET1+2 determines a TPC command TPC1+2 based on the third SIR value SIR1+2. The generated power control commands TCP1, TCP2 and TCP1+2 are based on the estimated SIR values SIR1, SIR2 and SIR1+2 and are directed to the base station 350 in order to adjust the power of the downlink signals DL1, DL2. The power loop controller 320 includes a switch 321 to switch one of the TPC commands TPC1, TPC2 and TPC1+2 for transmission to the base station 350 by the transmitter 360. For higher configurations with three and more antennas a higher number of TPC determinators may be implemented in the power loop controller 320, e.g. corresponding to the number of SIR estimators in the SIR estimation unit 310.

The power loop controller 320 further includes a power adjuster PWR_ADJ coupled to the first 305 and second 306 receiver circuits, and to the combiner MRC. The power adjuster PWR_ADJ adjusts a power of the transmitter 360 based on TPC commands included in the multipath signals F1, F2 or F1+2 transmitted by the base station 350.

Figure 5:
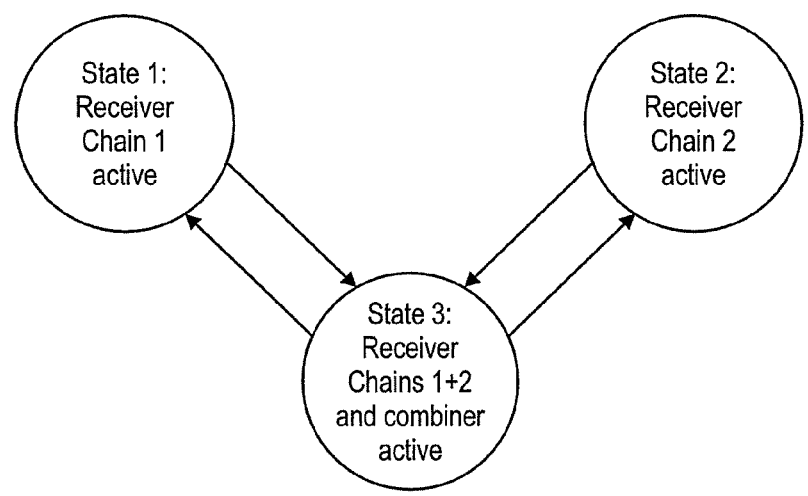
FIG. 5 schematically illustrates a state diagram of a system as depicted in FIG. 3 according to one embodiment.

In one embodiment, the system can be in three possible states as shown in FIG. 5:

State 1) Antenna 1 301 active, Demod1 and Rake1 305 active. Switch 321 is set to select the TPC commands TPC1 for transmission to the base station 350.

State 2) Antenna 2 302 active, Demod2 and Rake2 306 active. Switch 321 is set to select the TPC commands TPC2 for transmission to the base station 350.

State 3) Antenna 1 301 and Antenna 2 302 active, Demod1 and Rake1 305 and Demod2 and Rake2 306 and Combiner MRC active. Switch 321 is set to select the TPC commands TPC1+2 for transmission to the base station 350.

Selection of the TPC commands included in the multipath signals F1, F2 or F1+2 is performed by the power adjuster PWR_ADJ as follows:

State 1) TPC commands included in multipath signal F1 are used.

State 2) TPC commands included in multipath signal F2 are used.

State 3) TPC commands included in multipath signal F1+2 are used.

The transmitter 360 may transmit an uplink frame UL by means of a transmission antenna 361 to the base station 350. The transmitter 360 includes a modulator 363 to modulate an uplink frame 362 including the TPC command TPC_UL switched by the switch 321 and a power unit 364 to amplify the modulated uplink frame 362 to provide the uplink signal UL for transmission by the transmission antenna 361.

The TPC quality estimator 340 estimates a quality measure of the transmit power control commands included in the multipath signals F1 and F2 and F1+2. A first quality measure QE1 is based on the first multipath signal F1, and a second quality measure QE2 is based on the second multipath signal F2, and a third quality measure is based on the combined multipath signal F1+2. The quality measures may be signal-to-noise ratios, signal-to-interference-plus-noise ratios or error rates of the transmit power control commands.

The diversity controller 330 decides on the state of the system as shown in FIG. 5, hence diversity controller 300 decides on the activation or deactivation of receiver chains 1 and 2 (a receiver chain includes the antenna, the demodulator and Rake receiver) and of the combiner. The diversity controller 330 includes a synchronization detector SYNC_DET which is coupled to the TPC quality estimator 340 to receive the estimated quality measures QE1 and QE2 and QE1+2. The synchronization detector SYNC_DET detects synchronization of the first multipath signal F1 by comparing the first quality measure QE1 against a lower threshold $Q_{out}$ and against a higher threshold $Q_{in}$. If the first quality measure QE1 falls below the lower threshold $Q_{out}$, the signal F1 is out of synchronization (out-of-sync or OutOfSync). If the first quality measure QE1 exceeds the upper threshold $Q_{in}$, the signal F1 is in synchronization (in-sync or InSync). The synchronization detector SYNC_DET detects synchronization of the second multipath signal F2 by comparing the second quality measure QE2 against a lower threshold $Q_{out}$ and against a higher threshold $Q_{in}$. If the second quality measure QE2 falls below the lower threshold $Q_{out}$, the signal F2 is out of synchronization (out-of-sync or OutOfSync). If the second quality measure QE2 exceeds the upper threshold $Q_{in}$, the signal F2 is in synchronization (in-sync or InSync). The synchronization detector SYNC_DET detects synchronization of the combined multipath signal F1+2 by comparing the quality measure QE1+2 against a lower threshold $Q_{out}$ and against a higher threshold $Q_{in}$. If the quality measure QE1+2 falls below the lower threshold $Q_{out}$, the signal F1+2 is out of synchronization (out-of-sync or OutOfSync). If the quality measure QE1+2 exceeds the upper threshold $Q_{in}$, the signal F1+2 is in synchronization (in-sync or InSync). The lower and higher thresholds $Q_{out}$ and $Q_{in}$ may be transmitted by the base station 350, e.g. in an initialization phase as configurable parameters or may be stored in the user equipment 300, e.g. as pre-configured parameters.

The synchronization detector SYNC_DET provides a synchronization signal 331 at its output depending on the synchronization of one of the multipath signals F1 and F2 and F1+2. The synchronization signal 331 depends on the system state. In State 1) the synchronization signal 331 may indicate out-of-sync if the multipath signal F1 is out of synchronization, and may indicate in-sync if the multipath signal F1 is in synchronization. In State 2) the synchronization signal 331 may indicate out-of-sync if the multipath signal F2 is out of synchronization, and may indicate in-sync if the multipath signal F2 is in synchronization. In State 3), the synchronization signal 331 may indicate out-of-sync if the multipath signal F1+2 is out of synchronization, and may indicate in-sync if the multipath signal F1+2 is in synchronization. Depending on the synchronization signal 331 the transmitter 360 may be turned on or off. If the synchronization signal 331 indicates out-of-sync, the transmitter 360 may be turned off in order to avoid the transmitter 360 from transmitting uplink signals UL based on unsecure detected transmit power control commands in the downlink signals DL1, DL2 or DL1+2. If the synchronization signal 331 indicates in-sync, the transmitter 360 may be turned on due to a reliable detection of transmit power control commands in the downlink signals DL1, DL2 or DL1+2.

Depending on the synchronization signal 331 provided at the output of the synchronization detector SYNC_DET the plurality of receiver circuits 305, 306 may be switched on. If the synchronization signal 331 indicates the out-of-sync state in State 1 or State 2, both receiver circuits 305, 306 may be switched on to increase receiver diversity in order to improve the receiver gain of the user equipment 300, hence a state transition to State 3 is performed.

The diversity controller 330 further includes a high-windup detector HW_DET which receives the estimated SIR values SIR1 and SIR2 of the first and second SIR estimators SIR_EST1 and SIR_EST2. In State 1, the estimated SIR value SIR_EST1 is compared against a target SIR ($SIR_{target}$) to check if the received downlink signal DL1 is in a high-windup state which will be explained below (see FIG. 7). In State 2, the estimated SIR value SIR_EST2 is compared against a target SIR ($SIR_{target}$) to check if the received downlink signal DL2 is in a high-windup state. In case of DPCH, the target SIR may be determined from a target block error rate which may be determined from a target Quality of Service $QoS_{target}$. The target Quality of Service may be transmitted by the base station 350, e.g. in an initialization phase as a configurable parameter or may be stored in the user equipment 300, e.g. as a pre-configured parameter. In case of F-DPCH, the target SIR may be determined from a target TPC command error rate.

Depending on the state signaled at the output of the high-windup detector HW_DET the plurality of receiver circuits 305, 306 may be switched on or off. In State 1 or State 2, if the output of the high-windup detector HW_DET indicates a high-windup state, both receiver circuits 305, 306 may be switched on to increase receiver diversity in order to improve the receiver gain of the user equipment 300, hence a state transition to State 3 is performed.

For state transitions from State 3 back to State 1 or State 2, a timer may be started when entering State 3. When the timer expires, state transition to State 1 or State 2 may be performed. The receiver circuit which stays switched-on (i.e., state transition to State 1 or State 2) may be the receiver circuit providing the downlink signal having the better SIR or the better TPC quality. Alternatively, the diversity controller may check other measurements performed by the user equipment (e.g. CPICH Ec/Io or CPICH RSCP as defined by 3GPP) in order to decide when to return to State 1 or State 2.

The diversity controller 330 may include a combiner COMB, which is coupled to the synchronization detector SYNC_DET and the high-windup detector HW_DET. The combiner COMB combines the synchronization signal 331 and the output signal of the high-windup detector HW_DET according to a specified rule and provides an output signal indicating a state of reduced performance as a combination of an out-of-sync state and a high-windup state. The specified rule of the combiner COMB may be a logical AND combination or a logical OR combination or any other kind of combination. If the output of the combiner COMB indicates a state of reduced performance, both receiver circuits 305, 306 may be switched on to increase receiver diversity in order to improve the performance of the user equipment 300.

There may be three embodiments of the diversity controller 330 in the user equipment 300 described above. In a first embodiment the diversity controller 330 includes the synchronization detector SYNC_DET to provide the out-of-sync and in-sync states for controlling the receiver circuits 305, 306. The high-windup detector HW_DET and the combiner COMB are not needed.

In a second embodiment the diversity controller 330 includes the high-windup detector HW_DET to provide the high-windup and non high-windup states for controlling the receiver circuits 305, 306. The synchronization detector SYNC_DET is not needed for controlling the receiver circuits 305, 306 but may be needed for switching on and/or off the transmitter 360. The combiner COMB is not needed.

In a third embodiment the diversity controller 330 includes the synchronization detector SYNC_DET, the high-windup detector HW_DET and the combiner COMB to provide the states of reduced and non-reduced performance for controlling the receiver circuits 305, 306. The synchronization detector SYNC_DET may be additionally used for switching on and/or off the transmitter 360.

The base station 350 includes a receive antenna 352 to receive the uplink signal UL from the user equipment 300 and a demodulator to demodulate the received uplink signal UL providing a received uplink frame 358. Depending on a transmit power control command TPC_UL included in the received uplink frame 358 the base station 350 adjusts its power for transmitting downlink signals DL1, DL2. The downlink signals DL1, DL2 are generated from downlink frames 354 including downlink transmit power control commands TPC_DL which are used by the base station 350 to request the user equipment 300 adjusting a power of the uplink signals UL transmitted by the user equipment 300. The base station 350 further includes a power range adjuster 355 to adjust a power range of the downlink frames 354 between a minimum power P_MIN and a maximum power P_MAX. Both power values are configurable by the network. If uplink transmit power control commands TPC_UL request a higher power than the maximum power P_MAX configured by the network, the power of the downlink signals DL1, DL2 is limited by the power range adjuster 355 to the maximum power P_MAX (high-windup scenario). A modulator 356 modulates the downlink frames 354 to analog downlink signals DL1, DL2 transmitted by the transmission antenna 351 to the user equipment 300.

Figure 4:
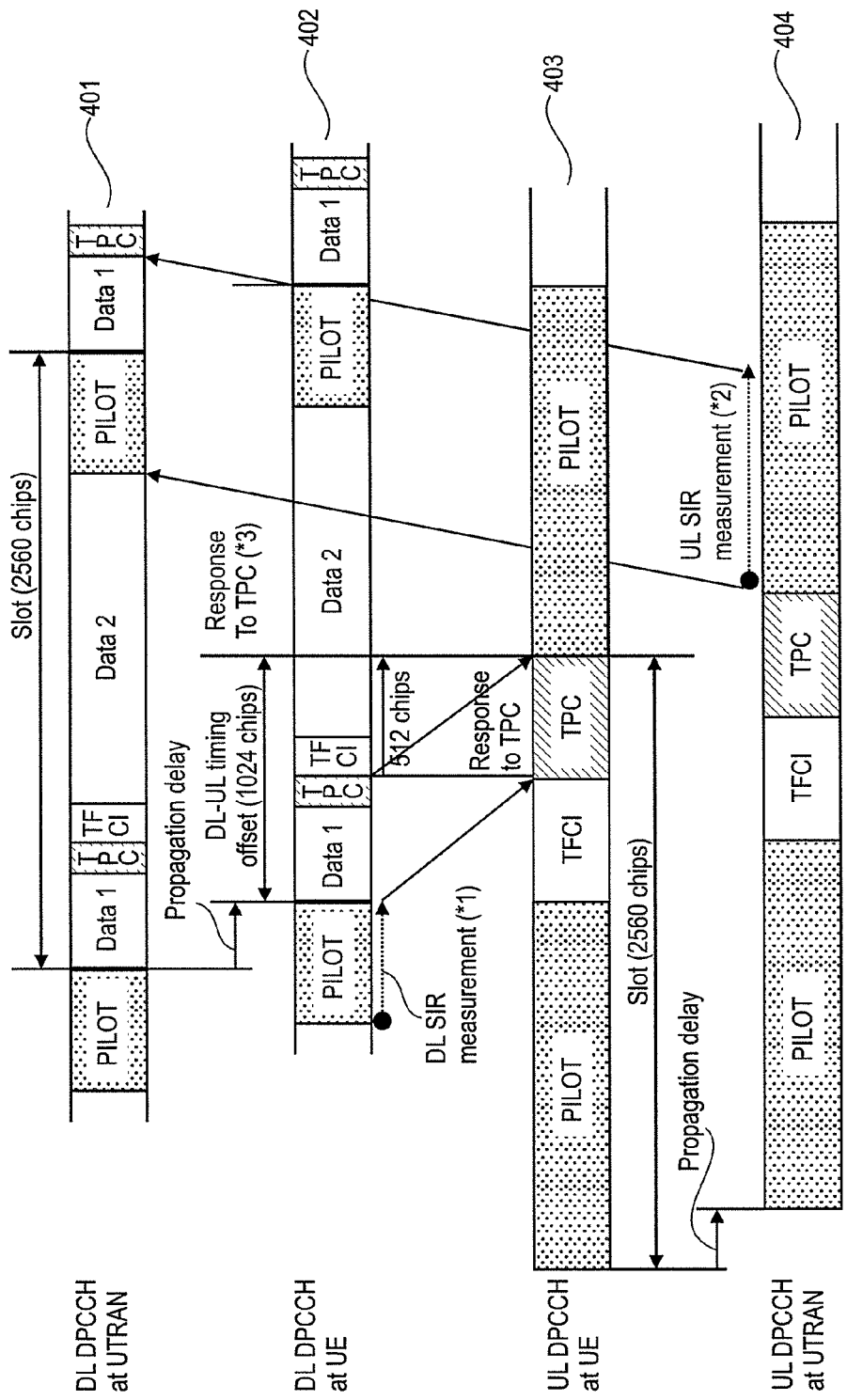
FIG. 4 schematically illustrates examples of downlink signals and uplink signals between a base station and a user equipment according to one embodiment.

FIG. 4 schematically illustrates examples of downlink signals and uplink signals between a base station and a user equipment according to one embodiment. The embodiment is according to 3GPP TS 25.214 V7.15.0 (2010-03), Figure B.1. A first frame 401, e.g. a Downlink DPCCH frame, including data fields (Data1, Data2), pilot symbols (PILOT), transmit power control commands (TPC) and Transport Format Combination Indicator (TFCI) bits may correspond to the downlink frame 354 of the base station 350 depicted in FIG. 3, including downlink power control commands TPC_DL which are used by the base station 350 to request the user equipment 300 adjusting a power of the uplink signals UL transmitted by the user equipment 300.

A second frame 402 may correspond to the detected multipath signals F1, F2 or the combined multipath signal F1+2, which are received by the user equipment 300 after a propagation delay and depending on multipath diversity. The content of the second frame 402 corresponds to the content of the first frame 401. However, the second frame 402 is delayed by a propagation delay, which depends on the respective multipath being used for transmission.

A third frame 403, e.g. an Uplink DPCCH frame, including transmit power control commands (TPC), pilot symbols (PILOT) and TFCI bits may correspond to the uplink frame 362 of the user equipment 300 depicted in FIG. 3, which includes uplink transmit power control commands TPC_UL. The TPC commands of the third frame 403 may be determined by an SIR measurement of pilot symbols or TPC symbols of the second frame 402, F1, F2, F1+2.

A fourth frame 404 may correspond to the received uplink frame 358 of the base station 350 depicted in FIG. 3. The fourth frame 404 is delayed by the propagation delay in uplink direction, which depends on the multipath fading. The base station may determine the downlink transmit power control commands TPC_DL based on an SIR measurement of the pilot symbols of the uplink frame 404, 358 and insert TPC_DL into the downlink frame 401, 354.

Figure 6:
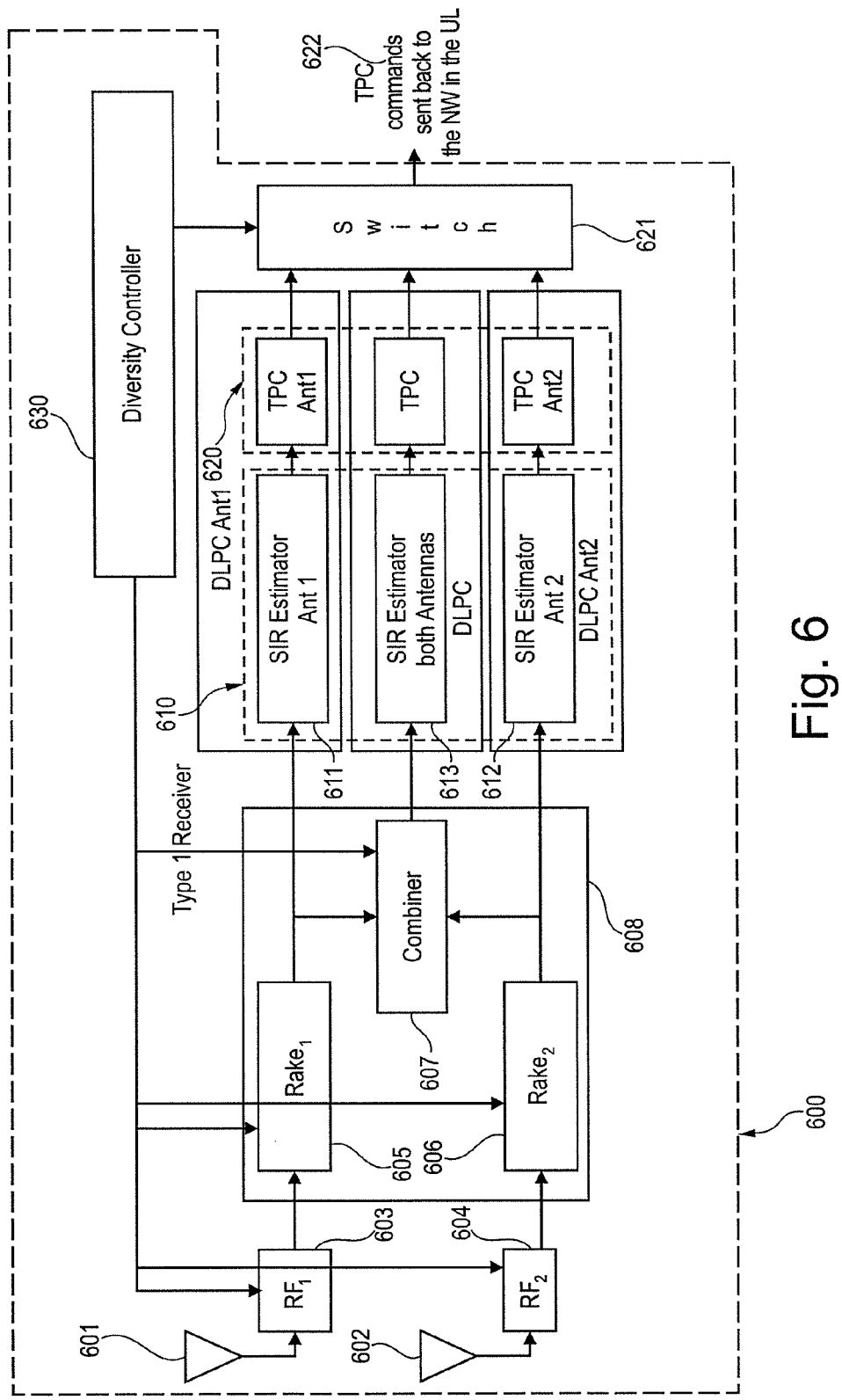
FIG. 6 schematically illustrates a user equipment according to one embodiment.

FIG. 6 schematically illustrates a user equipment 600 according to one embodiment. The user equipment 600 includes a plurality of antennas, e.g. a first antenna 601 and a second antenna 602, to receive downlink signals from a base station. The user equipment 600 includes a plurality of radio frequency (RF) units 603, 604 ($RF_1$, $RF_2$), each of them coupled to a respective antenna 601, 602 for mixing and demodulating the received downlink signals.

The user equipment 600 includes a receiver 608, e.g. a type 1 receiver, including a plurality of rake receiver circuits 605, 606 and a combiner 607, e.g. a maximum ratio combiner MRC. Although FIG. 6 depicts only two rake receiver circuits 605 and 606, the receiver 608 may include any other number of rake receiver circuits, e.g. three, four or more. Each of the rake receiver circuits is coupled to a respective one of the plurality of RF units 603, 604. For example, the first rake receiver circuit 605 may be coupled to the first RF unit 603 and the second rake receiver circuit 606 may be coupled to the second RF unit 604. FIG. 6 illustrates a number of two antennas with corresponding RF units and rake receiver circuits. Any other number is likewise possible.

The user equipment 600 further includes an SIR estimation unit 610 including a plurality of SIR estimators 611, 612, 613, a switch 621, a power loop controller 620 and a diversity controller 630. Each of the SIR estimators 611, 612, 613 are coupled to a respective one of the plurality of rake receiver circuits 605, 606 and to the combiner 607. The switch 621 is coupled to the power loop controller 620 and to the diversity controller 630.

The functionality of the RF units 603, 604, the rake receiver circuits 605, 606, the combiner 607 may correspond to the respective circuits described above in connection with FIG. 3. The functionality of the SIR estimation unit 610 may correspond to the functionality of the SIR estimation unit 310 described above in connection with FIG. 3. The SIR estimators 611, 612, 613 may estimate a signal-to-interference-plus-noise ratio value, a signal-to-interference ratio value, a signal-to-noise ratio value or any other quality measure characterizing the received multipath signal at the respective output of the receiver 608.

The power loop controller 620 of FIG. 6 is directly connected to each of the SIR estimators 611, 612, 613 to receive all (or at least more than one) SIR values provided by the SIR estimators 611, 612, 613. The power loop controller 620 contains a first TPC determinator (TPC_Ant1), a second TPC determinator (TPC_Ant2) and a third TPC determinator (TPC). Each of the TPC determinators is coupled to a respective one of the SIR estimators 611, 612, 613 to receive the respective SIR values. For each of the received SIR values the power loop controller 620, i.e. the TPC determinators of the power loop controller 620, may determine a respective TPC command based on the respective SIR value. The TPC determinators may be configured to estimate TPC symbols included in the downlink signals as a measure for the quality of the received downlink signals. The SIR estimators 611, 612, 613 may be configured to estimate SIR values of pilot symbols included in the downlink signals as a measure for the quality of the received downlink signals. The power loop controller 620 performs Downlink Power Control (DLPC) processing by providing transmit power control (TPC) commands 622 which may be sent back to the network (NW), e.g. by a transmitter 360 as depicted in FIG. 3. The generation of TPC commands may be based on the SIR values estimated by the SIR estimators 611, 612, 613.

The switch 621 is controlled by the diversity controller 630 and selects a respective TPC command determined by the TPC determinators of the power loop controller 620. The setting of the switch 621 depends on the system state determined by the diversity controller 630. The uplink (UL) TPC commands may be sent back to the network (NW). FIG. 6 illustrates a selection of TPC commands by the switch 621.

Beside the selection of TPC commands the diversity controller 630 may further control activation and/or deactivation of the rake receiver circuits 605, 606 by activating those rake receiver circuits receiving the multipath signals of highest signal-to-interference-plus-noise ratios and deactivating those rake receiver circuits receiving multipath signals having worse quality. For example in a configuration with five antennas and five rake receiver circuits, the diversity controller 630 may activate the two rake receiver circuits providing the highest SIR values and deactivate the three rake receiver circuits providing the lowest SIR values. The RxDiv processing makes the user equipment reduce its power consumption and improve its accuracy, as rake receiver circuits providing distorted signals can be switched off. Switching off distortion results in a higher accuracy because only signals having high signal-to-interference-plus-noise ratios are used for further processing. The switch may further control activation/deactivation of the combiner 607, the RF units 603, 604 and the antennas 601, 602.

The idea behind this concept is to turn on receiver diversity (RxDiv) only when the performance improvement achieved via RxDiv is actually required in order to avoid call drops. Although the resulting device may not be fully compliant to the 3GPP "Enhanced Performance Requirements Type 1" Specification as described in the document 3GPP TS25.101 V7.16.0 (2009-05), Sections 8.3, 8.6 and 8.8, however, it will achieve significantly reduced call drop rates at comparatively small increase of current consumption and hence, at only slightly reduced talk time.

Figure 7:
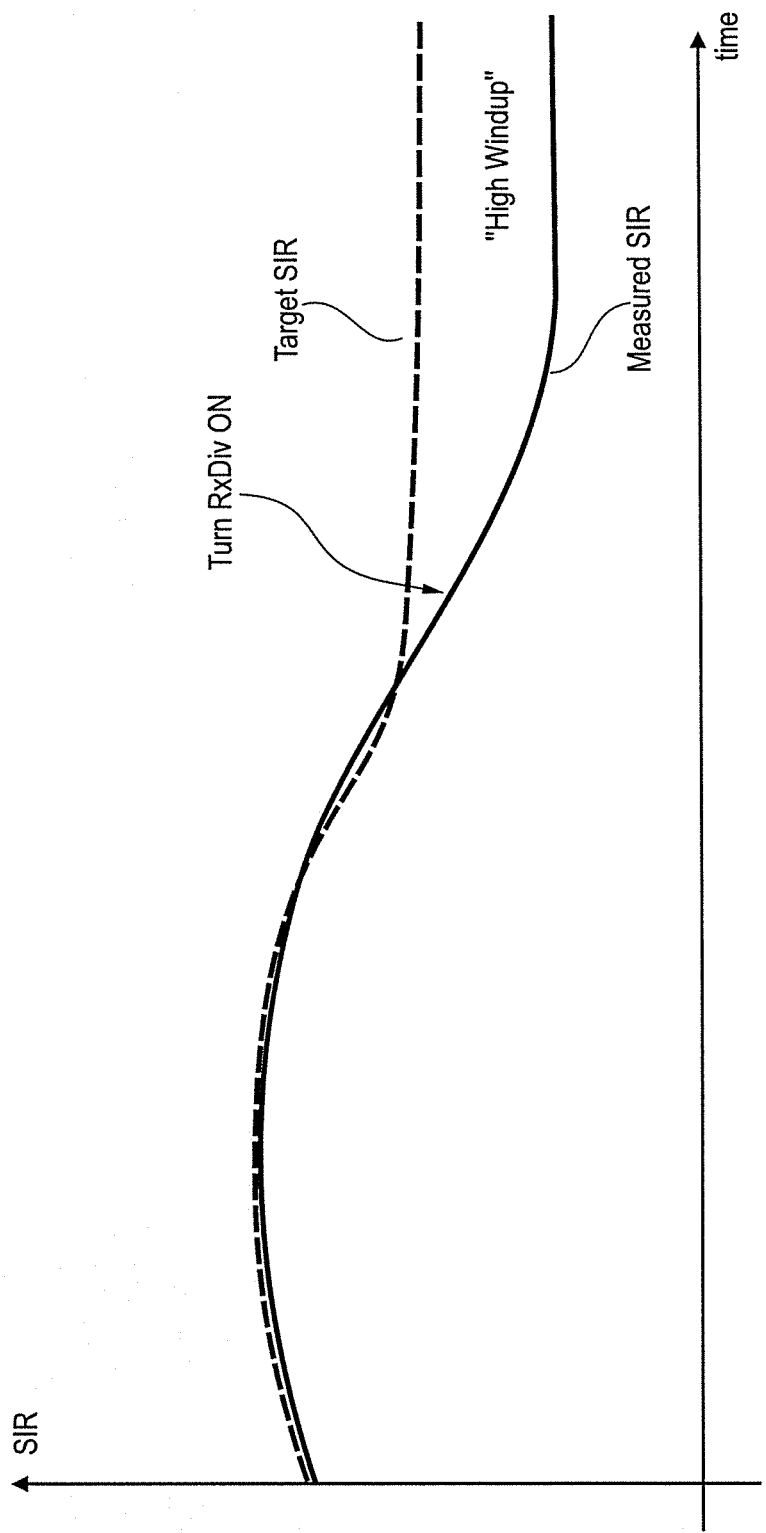
FIG. 7 schematically illustrates a performance diagram of a user equipment according to one embodiment depicting a high-windup scenario.

FIG. 7 schematically illustrates a performance diagram of a user equipment according to one embodiment depicting a high-windup scenario. In the field, downlink channels, e.g. DPCH channels, are operated by the network (NW), i.e. the base station, with closed loop power control, i.e. a quality of service (QoS) target may be set by the network as a block error rate and outer and inner loop power control mechanism may be applied to guarantee, e.g. by requesting additional transmit power from the network in case it is needed, that the QoS target is actually achieved. Nevertheless, call drops may occur in some situations.

One such situation is when the network downlink (e.g. DPCH or F-DPCH) transmit power reaches the upper limit set by the network. This scenario is illustrated in FIG. 3. The user equipment 300 requests the base station 350 by the TPC_UL command in the uplink frame 358 to increase the power of the downlink frames DL1, DL2. Such an increase, however, conflicts with the maximum power value P_MAX of the power range adjuster 355 which maximum power is set by the network. The base station 350 is not allowed to increase the power beyond the admissible level. The power control mechanism is no longer able to guarantee the QoS target and transmission errors may occur, which may lead finally to a call drop. This scenario is referred to as the power control high-windup situation and is illustrated in FIG. 7.

FIG. 7 exemplarily depicts the measured SIR value with respect to the target SIR value. As long as the network is able to provide the power the user equipment requests, the closed power loop mechanism controls the power of the downlink signals to be as high as needed to make the measured SIR track the target SIR. At about two thirds of the time axis the maximum power is limited by the base station such that the available (measured) SIR at the user equipment becomes significantly smaller than the required (target) SIR at the user equipment. The user equipment is in a high-windup state. Depending on the duration of the high-windup state and depending on the difference between target SIR and measured SIR the user equipment may become unable to hold the communication, a call drop will finally happen.

User equipments according to embodiments depicted in FIGS. 1-3, 5 and 6 may be able to detect the high-windup situation, e.g. by measuring and filtering the difference between target SIR and measured SIR. The high-windup state may be detected when a difference between measured SIR at the user equipment and target SIR at the user equipment exceeds a threshold. When entering (or even before entering) a high-windup situation, such user equipments may activate receiver diversity (RxDiv), providing considerable performance gain. Since the required transmit power is accordingly lower when RxDiv is turned on, the measured SIR may reach the target SIR and the high-windup situation may be left or avoided. At least the RxDiv performance gain for user equipments according to embodiments of FIGS. 1-3 and 6 significantly reduces occurrences of high-windup states and thus the probability of call drops.

Figure 13:
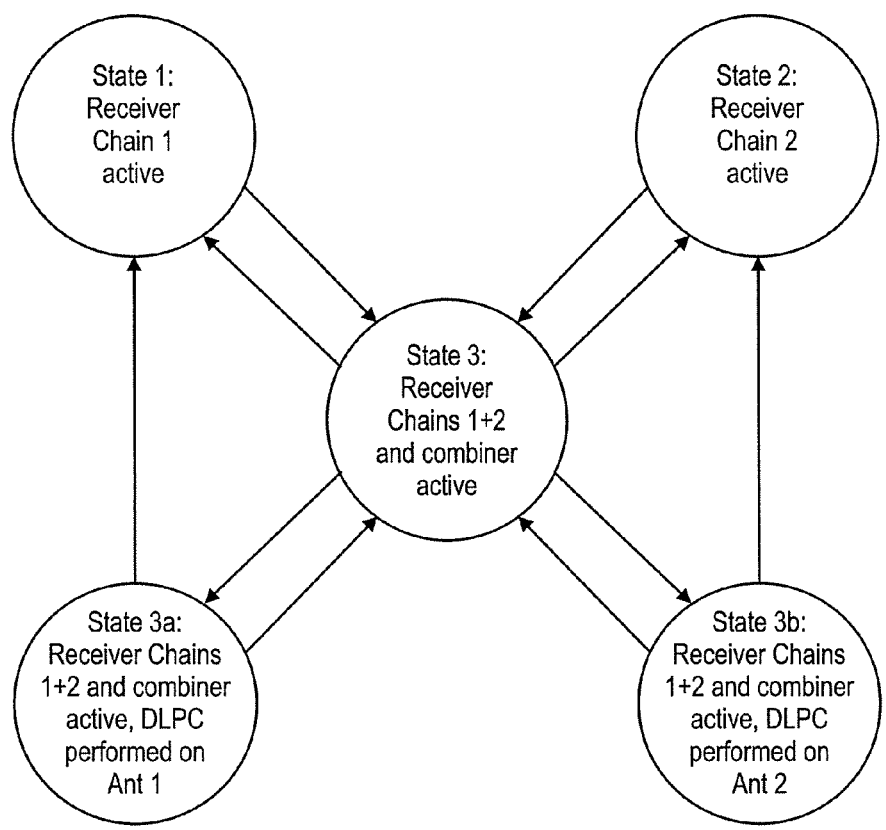
FIG. 13 schematically illustrates a further state diagram of a system as depicted in FIG. 3 according to one embodiment.

RxDiv may be smoothly deactivated by introducing new states into the system state diagram as shown in FIG. 13. The state diagram shown in FIG. 5 with States 1, 2, 3 is extended by the new States 3$a$ and 3$b$ (so called DLPC trial states):

State 3$a$) Antenna 1 301 and Antenna 2 302 active, Demod1 and Rake1 305 and Demod2 and Rake2 306 and Combiner MRC active. Switch 321 is set to select the TPC commands TPC1 for transmission to the base station 350.

State 3$b$) Antenna 1 301 and Antenna 2 302 active, Demod1 and Rake1 305 and Demod2 and Rake2 306 and Combiner MRC active. Switch 321 is set to select the TPC commands TPC2 for transmission to the base station 350.

In the new States 3$a$ and 3$b$, RxDiversity is kept turned on (both receiver chains are kept active) and only the downlink power control (DLPC) is switched to consider only one antenna (Antenna 1 in State 3$a$ and Antenna 2 in State 3$b$).

This allows to keep RxDiv switched on and thus maintain demodulation performance and switch only the DLPC to one antenna in order to check whether a windup situation still exists or not, before returning to State 1 or State 2. The one antenna used for DLPC (hence, the state transition to State 3$a$ or 3$b$) may be the antenna showing better signal quality. The SNR estimation unit 610 uses a plurality of SNR estimators 611, 612, 613. One SNR estimator 613 is used for operation with two antennas 601, 602 and the other SNR estimators

611, 612 are used for operation with only one of the antennas 601, 602. Thereby, it can easily be detected in States 3a and 3b if the high-windup state still continues without compromising the diversity gain, as both antennas are still active and receiving. If high-windup still exists, RxDiv is kept turned on, hence a state transition back to State 3 is performed. Otherwise, a state transition from State 3a to State 1 or from State 3b to State 2 is performed (i.e. the worse antenna (and/or the corresponding receiver circuit) is turned off).

The basic concept of such user equipments is to turn on RxDiv only when the performance improvement achieved via RxDiv is actually required in order to avoid call drops. Thereby, nearly the same reduction in call drop rates will be achieved as when RxDiv is always turned on during downlink (e.g. DPCH) reception, but at significantly reduced current consumption. Hence, the talk-time of such user equipments using RxDiv control will be significantly larger than for a device using RxDiv all the time during downlink (e.g. DPCH) reception, and there will only be a relatively small reduction in talk-time compared to a device using no RxDiv at all.

The high-windup determination may be realized by a diversity controller, e.g. a diversity controller 330 as depicted in FIG. 3 which includes a high-windup detector HW_DET receiving estimated SIR values SIR1 and SIR2 of two multipath signals provided by an SIR estimation unit 310. The value $SIR_{target}$ of FIG. 3 may correspond to the target SIR of FIG. 7. The diversity controller may accordingly turn off/on the receiver circuits.

Figure 8:
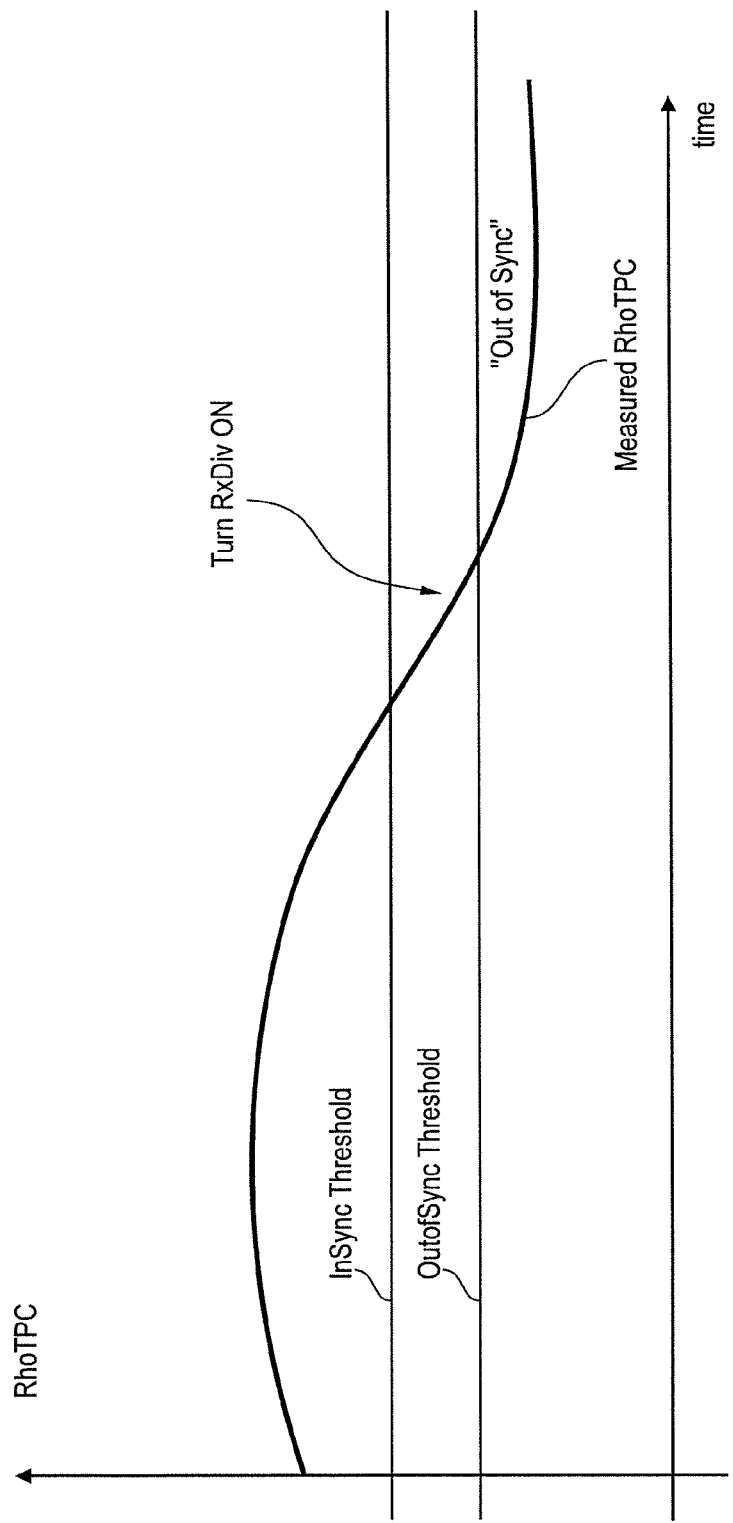
FIG. 8 schematically illustrates a performance diagram of a user equipment according to one embodiment depicting an out-of-sync scenario.

FIG. 8 schematically illustrates a performance diagram of a user equipment according to one embodiment depicting an out-of-sync scenario. Synchronization states of the user equipment, i.e. in-sync and out-of-sync states are characterized by a quality of transmit power control (TPC) commands transmitted in the downlink signals from base station to user equipment. When this quality falls below a lower threshold (OutofSync threshold in FIG. 8) the user equipment is unable to reliably detect the received TPC commands and falls out of synchronization, i.e. is in the out-of-sync state. When said quality exceeds an upper threshold (InSync threshold in FIG. 8) the user equipment is able to reliably detect the received TPC commands and to adjust the power of its transmitter, the user equipment is in the in-sync state.

According to one embodiment, user equipments may measure the quality of the TPC commands as the SIR value of the TPC commands, referred to as RhoTPC in FIG. 8. User equipments may also use another quality measure, such as the SNR value or an error value of the TPC commands. When the quality of received TPC commands, e.g. measured as the RhoTPC value, hits the OutOfSync threshold depicted in FIG. 8 link synchronization has to be maintained and verified during ongoing calls according to 3GPP using the quality of the TPC commands steering the transmit power of the user equipment. When the actual RhoTPC hits the OutOfSync threshold, the user equipment transmitter must be turned off according to 3GPP, and may be turned on again only when another quality threshold, the so called InSync threshold which is higher than the OutOfSync threshold, is met again. If this is not achieved within a certain time specified by the network, a call drop cannot be avoided. This scenario is referred to as the out-of-sync situation and is illustrated in FIG. 8.

FIG. 8 exemplarily depicts the RhoTPC value with respect to the InSync and OutOfSync thresholds. As long as the quality of the TPC commands, i.e. RhoTPC is above the lower OutOfSync threshold, the user equipment is in in-sync state and the TPC commands sent by the base station can be reliably detected by the user equipment. At about two thirds of the time axis the RhoTPC value falls below the OutOfSync threshold. The user equipment enters the out-of-sync state and turns off its transmitter. Depending on the duration of the out-of-sync state the user equipment may become unable to hold the communication provoking a call drop.

User equipments according to embodiments depicted in FIGS. 1-3, 5 and 6 may be able to detect the out-of-sync situation, e.g. by measuring the RhoTPC value and comparing it to the lower OutOfSync threshold. The out-of-sync scenario can be easily detected by measuring and filtering the difference between OutOfSync threshold and measured RhoTPC. When entering an out-of-sync situation, such user equipments may activate receiver diversity (RxDiv), providing considerable performance gain. Since the required transmit power and thus the power of the TPC commands in the downlink signals and its RhoTPC value is accordingly lower when RxDiv is turned on, the RhoTPC value may reach the InSync threshold and the out-of-sync situation may be finished. At least the RxDiv performance gain for user equipments according to embodiments of FIGS. 1-3, 5 and 6 significantly reduces occurrences of out-of-sync states and thus the probability of call drops.

For turning RxDiv off the user equipment may use the procedures as described above.

The user equipment may turn RxDiv on if either a high-windup condition or an out-of-sync condition or both high-windup and out-of-sync conditions are fulfilled. Duration of RxDiv utilization may be determined by a timer so that RxDiv is switched off after a certain time limit. The timer itself may be started if either a high-windup condition or an out-of-sync condition or both high-windup and out-of-sync conditions are fulfilled. Hence, when the timer expires, a state transition from State 3, 3a or 3b to State 1 or State 2 may be performed.

If RhoTPC estimators are not available, the procedure described above in connection with FIG. 7 and the high-windup situation can be used. This is possible since out-of-sync state is usually accompanied by high-windup state and vice versa.

The out-of-sync determination may be realized by a diversity controller, e.g. a diversity controller 330 as depicted in FIG. 3 which includes a synchronization detector SYNC_DET receiving estimated quality measures QE1 and QE2 of two multipath signals provided by a TPC quality estimator 340. Upper and lower threshold $Q_{in}$ and $Q_{out}$ of FIG. 3 may correspond to upper InSync threshold and lower OutOfSync threshold of FIG. 8. The diversity controller may accordingly turn off/on the receiver circuits.

Figure 9:
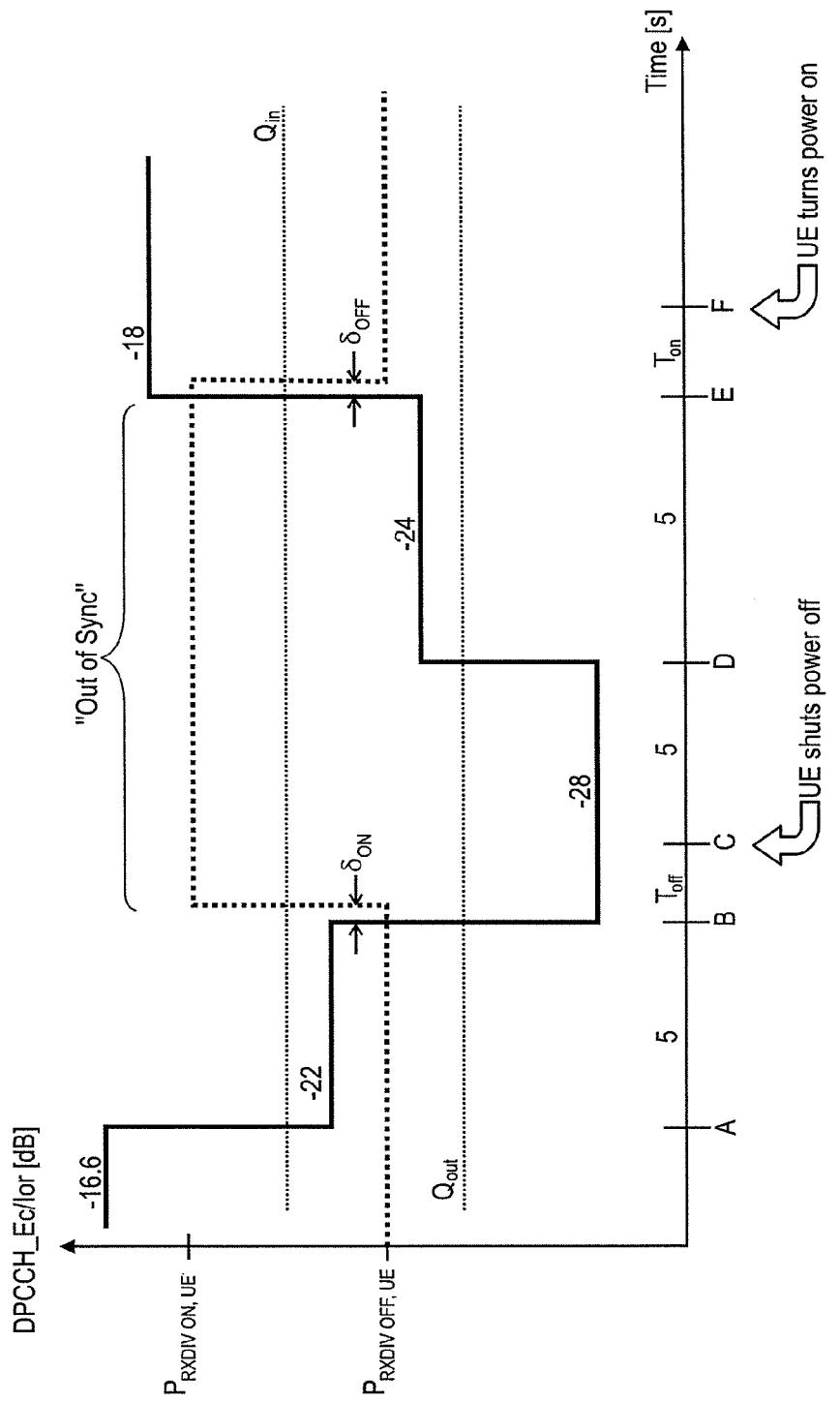
FIG. 9 schematically illustrates a test case for an out-of-sync scenario in a user equipment according to one embodiment.

FIG. 9 schematically illustrates a test case for an out-of-sync scenario in a user equipment according to one embodiment. The test case is according to 3GPP TS 34.121-1 V8.9.0 (2009-12), Section 5.4.4 "Out-of-synchronisation handling of output power". Both antenna connectors of the device under test, e.g. the user equipment according to an embodiment depicted in FIGS. 1-3, 5 and 6, shall be connected. The AWGN (additional white gaussian noise) signals applied to each receiver antenna connector shall be uncorrelated. The levels of the test signal applied to each of the antenna connectors shall be as defined in section 5.5.5.2.

In this test case, the requirements for the user equipment are that:
1. The user equipment shall not shut its transmitter off before point B,
2. The user equipment shall shut its transmitter off before point C, which is $T_{off}$=200 ms after point B,
3. The user equipment shall not turn its transmitter on between points C and E, 4. The user equipment shall turn its transmitter on before point F, which is $T_{on}$=200 ms after point E.

While a user equipment with static RxDiv according to 3GPP has RxDiv activated at all times during the test and hence shows the same level of current consumption throughout the test, a user equipment according to embodiments depicted in FIGS. 1-3, 5 and 6 will switch RxDiv on only after reaching point B. A short time interval $\delta_{ON}$ after point B the user equipment will detect out-of-sync state and turns RxDiv on which causes an increase in power consumption up to the level $P_{RXDivON,UE}$. Similarly a short time interval $\delta_{OFF}$ after point E the user equipment will detect in-sync state and turns RxDiv off causing a decrease in current consumption down to the level $P_{RXDivOFF,UE}$.

Figure 10:
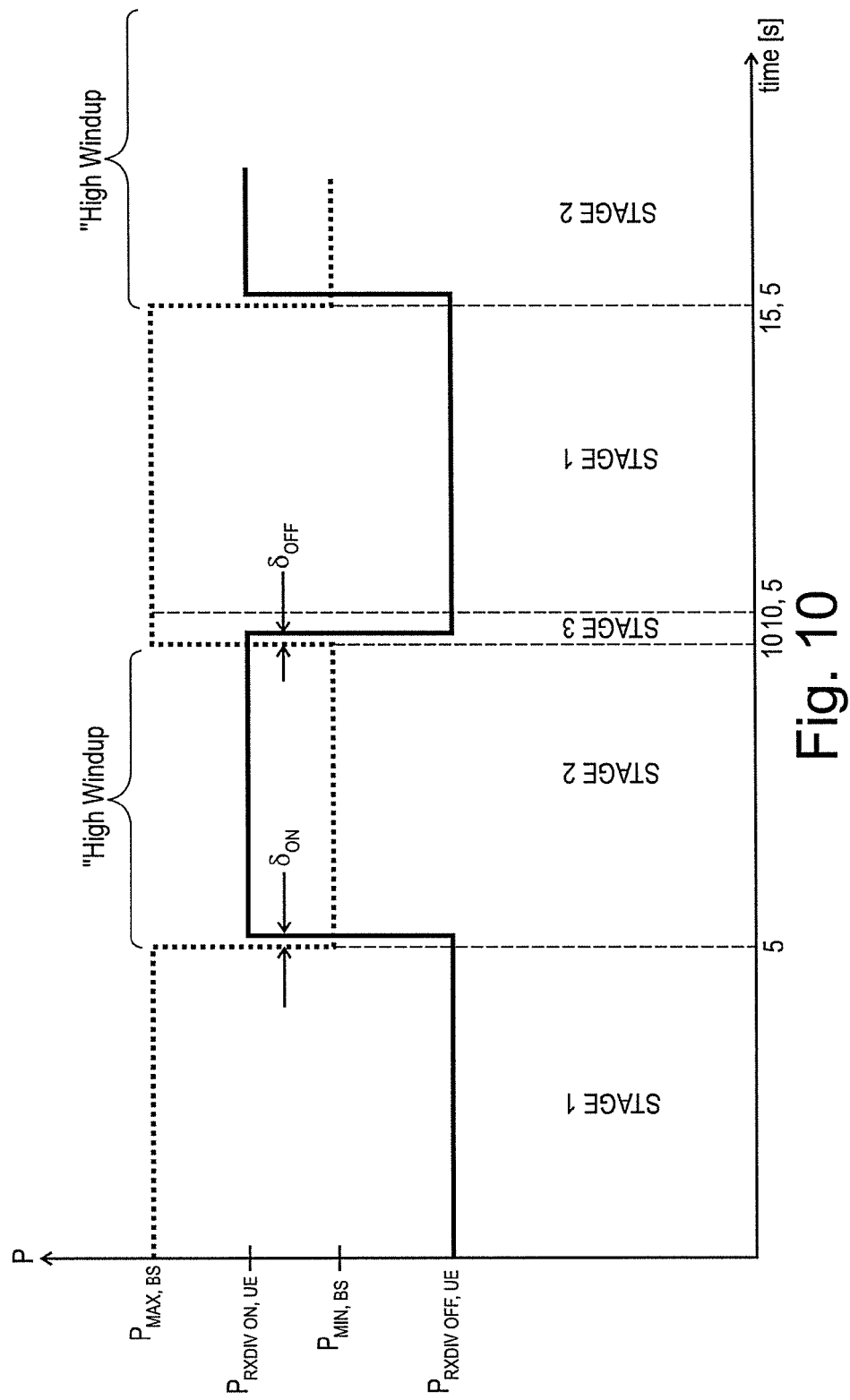
FIG. 10 schematically illustrates a test case for a high-windup scenario in a user equipment according to one embodiment.

FIG. 10 schematically illustrates a test case for a high-windup scenario in a user equipment according to one embodiment. The test case is according to 3GPP TS 34.121-1 V8.9.0 (2009-12), Section 7.8.3A "Power control in the downlink, wind up effects". In this test, the device under test, e.g. the user equipment according to an embodiment depicted in FIGS. 1-3, 5 and 6, is forced into a high-windup scenario in stage 2 of the test by switching the maximum available power of the base station from a high level $P_{MAX,BS}$ in stage 1 to a low level $P_{MIN,BS}$ in stage 2. In stage 3 the maximum available power is switched back to the high level $P_{MAX,BS}$ forcing the user equipment to leave the high-windup state.

While a user equipment with static RxDiv according to 3GPP will use both receive antennas throughout the test, i.e. RxDiv is activated at all times during the test, and hence shows the same level of current consumption throughout the test, a user equipment according to embodiments depicted in FIGS. 1-3, 5 and 6 will switch RxDiv on only after detecting high-windup in stage 2 of the test. A short time interval $\delta_{ON}$ after reaching stage 2 the user equipment will detect high-windup state and turn RxDiv on causing a significant increase in power consumption up to the level $P_{RXDivON,UE}$. Similarly, a short time interval $\delta_{OFF}$ after leaving stage 2 the user equipment will detect that high-windup state is over and turn RxDiv off causing a significant decrease in current consumption down to the level $P_{RXDivOFF,UE}$.

Figure 11:
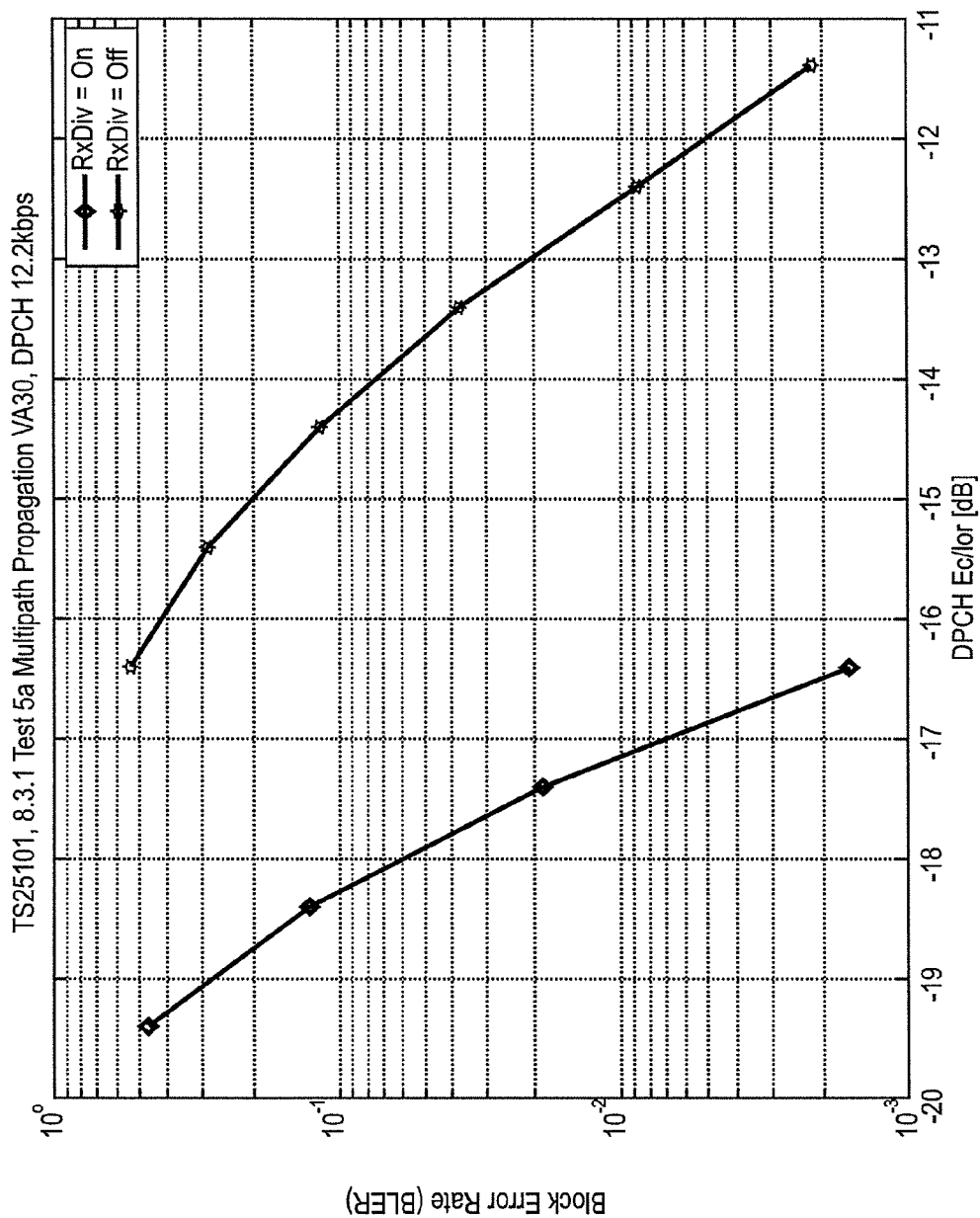
FIG. 11 schematically illustrates a performance gain diagram of a user equipment according to one embodiment.

FIG. 11 schematically illustrates a performance gain diagram of a user equipment according to one embodiment. The diagram depicts two performance curves of a user equipment according to an embodiment depicted in FIGS. 1-3 and 6 which is tested according to the test 5a of 3GPP TS 25.101 V7.16.0 (2009-05), Section 8.3.1 in a multipath fading propagation (VA30) for supporting the enhanced performance requirements type 1 for DCH. When the user equipment has RxDiv turned on (left curve), the base station may reduce its transmission power DPCH Ec/Ior by 3 to 5 dB compared to the user equipment state with RxDiv turned off (right curve). The performance gain of RxDiv depends on the required block error rate (BLER). When a high block error rate of 5% (upper points of left and right curve) is tolerated by the network administrator, a gain of 3 dB may be reached with receiver diversity turned on. When a low block error rate of 0.2% (lower points of left and right curve) is required by the network administrator, a gain of 5 dB may be reached with receiver diversity turned on.

It may be provided that the user equipment turns RxDiv on only when the performance improvement achieved by means of RxDiv is actually required in order to avoid call drops. Thereby, the gain of 3-5 dB as shown in FIG. 11 and nearly the same reduction in call drop rates may be achieved compared to a user equipment with static receiver diversity, but at significantly reduced current consumption.

Figure 12:
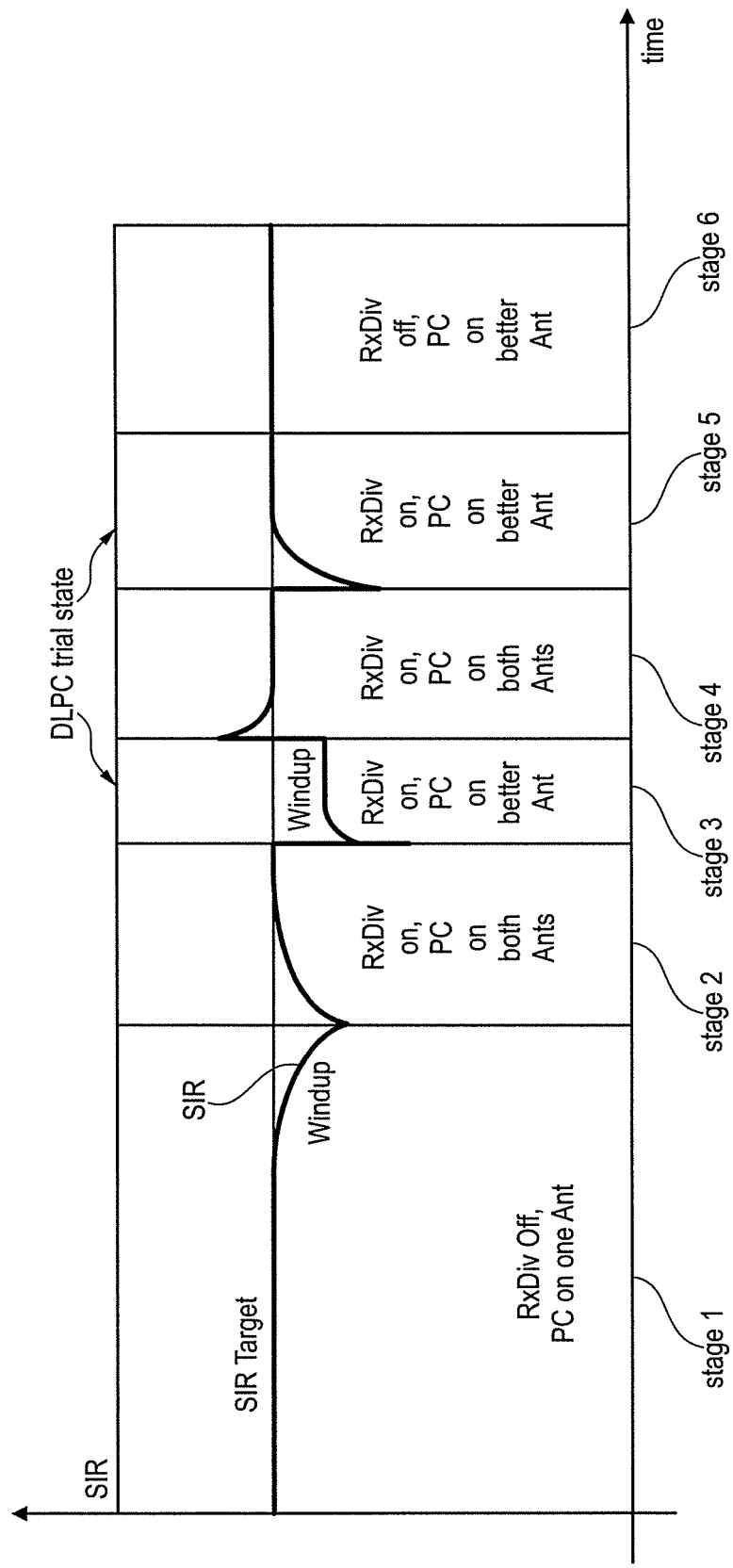
FIG. 12 schematically illustrates a performance diagram of a user equipment according to one embodiment.

FIG. 12 schematically illustrates a performance diagram of a user equipment according to one of the embodiments illustrated in FIGS. 1 to 3 and 6. The diagram depicts three curves illustrating signal-to-interference-plus-noise ratios (SIRs). The three curves depict SIR target which is set by the outer loop power control in case of DPCH transmission based on the QoS target (target block error rate) set by the network, or set according to the target TPC command error rate set by the network in case of F-DPCH, SIR which corresponds to measured SIR and describes the signal-to-interference-plus-noise ratio measured at the user equipment and true SIR which is measured in a trial state to describe the available SIR when the full RxDiv gain is available.

FIG. 12 illustrates six stages on the time axis. In a first stage receiver diversity (RxDiv) is switched off (i.e. one of the two antennas and the corresponding RF and receiver circuits are switched off) and power control (PC) is applied using the active antenna only. The system is in State 1 or 2 as shown in FIG. 13. According to FIG. 6, for example, the RxDiv controller 630 controls the switch 621 to switch one of the inputs of the switch 621 to its output in order to send a TPC command 622 (TPC Ant1 or TPC Ant2) related to one of the antennas 601, 602 back to the network. For example, TPC command TPC Ant1 related to the first antenna 601 is selected. At the end of stage 1 a windup situation occurs, e.g. multipath fading occurs which decreases the SIR of the multipath signal received by the first antenna 601, while the network is not able to increase its power.

When the windup situation is detected by the user equipment, the diversity controller activates RxDiv (i.e. the user equipment activates both antennas, both RF and receiver circuits) and performs power control on both antennas in stage 2. Hence the diversity controller performs a state transition to system State 3. A higher antenna gain resulting from RxDiv activation makes the measured SIR converge to the SIR Target. Once RxDiv is started, trials are performed periodically, e.g. at stage 3 and stage 5 (the diversity controller performs state transitions to DLPC trial States 3a or 3b), to turn it off again. The duration of the States 3, 3a and 3b may be determined by using individual timers.

At stage 3 power control is performed on the antenna obtaining better results (DLPC trial state 3a or 3b) while RxDiv is kept on and a windup situation still occurs. Therefore, a state transition back to State 3 is performed, hence at stage 4 power control is again performed on both antennas. Here the measured SIR converges to target SIR. At stage 5 power control is again performed on the better antenna (DLPC trial state 3a or 3b), while RxDiv is kept on and, initially the windup situation still occurs. But then the windup situation has finished and this is detected by the user equipment such that a state transition to system State 1 or 2 is performed in stage 6, i.e. the receiver chain (antenna, RF and receiver) showing worse performance is switched off and power control and reception are performed on the better antenna. Both at stage 1 (before the occurrence of the windup situation) and stage 6 (after the occurrence of the windup situation), RxDiv is switched off and the user equipment is in a power saving mode.

In FIG. 12 RxDiv is kept on at stages 2-5 and power control is performed in stage 3 and stage 5 for the better antenna only. It can be easily evaluated whether the windup situation still exists with the better antenna or not. RxDiv is only turned off after a verification that windup situation does no longer exist with the better antenna.

A method for downlink power control (DLPC) of a user equipment including a plurality of antennas and a plurality of receiver circuits each coupled to a respective one of the plurality of antennas is presented. The method includes receiving downlink signals from a base station by the plurality of antennas, processing the received downlink signals by the plurality of receiver circuits, estimating a quality of the received downlink signals, selectively activating at least one of the receiver circuits depending on the estimated quality of the received downlink signals and generating transmit power control commands based on the estimated quality of the received downlink signals. The transmit power control commands are directed to the base station to adjust the power of the downlink signals. The quality of the received downlink signals may be estimated by estimating SIR values of pilot symbols and/or TPC symbols included in the downlink signals.

A method for uplink power control (ULPC) of a user equipment including a plurality of antennas and a plurality of receiver circuits each coupled to a respective one of the plurality of antennas is presented. The method includes receiving downlink signals from a base station by the plurality of antennas, processing the received downlink signals by the plurality of receiver circuits, estimating a quality measure of transmit power control commands included in the downlink signals, selectively activating at least one of the receiver circuits depending on the estimated quality measure and adjusting the power of uplink signals directed to the base station based on the transmit power control commands. The power of the uplink signals may be turned off if the quality measure falls below a first threshold value and may be turned on if the quality measure exceeds a second threshold value.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it should be understood that embodiments of the invention may be implemented in discrete circuits, partially integrated circuits or fully integrated circuits or programming means. Also, the terms "exemplary", "for example" and "e.g." are merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

Although specific embodiments have been illustrated and described herein, it will be appreciated by those of ordinary skill in the art that a variety of alternate and/or equivalent implementations may be substituted for the specific embodiments shown and described without departing from the scope of the present invention. For instance, implementations described in the context of a user equipment could be applied to WCDMA transceivers, UMTS transceivers or to mobile communication transceivers relating to other technical standards such as e.g. GSM or derivatives thereof or applying other multiple access schemes such as e.g. TDMA, FDMA etc. This application is intended to cover any adaptations or variations of the specific embodiments discussed herein. Therefore, it is intended that this invention be limited only by the claims and the equivalents thereof.

What is claimed is:

1. A user equipment, comprising:
   a plurality of antenna ports configured to receive downlink signals from a base station;
   a plurality of receiver circuits each coupled to a respective one of the plurality of antennas ports and configured to process the received downlink signals;
   a quality estimation unit to estimate a quality of the received downlink signals, wherein the quality estimation unit comprises a signal-to-interference-and-noise ratio (SIR) estimation unit configured to estimate SIR values of transmission power control (TPC) symbols or of pilot symbols and TPC symbols comprised in the downlink signals as the quality of the received downlink signals;
   a power loop controller configured to generate transmit power control commands based on the estimated quality of the received downlink signals, the transmit power control commands configured to adjust a power of the downlink signals generated by the base station; and
   a diversity controller configured to selectively activate and deactivate one or more of the receiver circuits based on the estimated quality of the received downlink signals.

2. The user equipment of claim 1, further comprising a transmitter configured to transmit uplink signals directed to the base station, the uplink signals comprising the transmit power control commands.

3. The user equipment of claim 1, wherein the quality estimation unit comprises a plurality of SIR estimators, and wherein each of the receiver circuits is coupled to a respective one of the plurality of SIR estimators.

4. The user equipment of claim 3, further comprising a combiner circuit coupled to at least two receiver circuits of the plurality of receiver circuits, the combiner circuit being coupled to one of the plurality of SIR estimators.

5. The user equipment of claim 3, wherein the power loop controller comprises a plurality of TPC determinators, wherein each of the TPC determinators is coupled to a respective one of the plurality of SIR estimators.

6. The user equipment of claim 5, wherein each of the plurality of TPC determinators is configured to determine a transmit power control command based on the SIR value estimated by the SIR estimator coupled to the respective TPC determinator.

7. The user equipment of claim 1, wherein the diversity controller is configured to detect a high-windup situation or an out-of-sync situation, or both.

8. A user equipment, comprising:
   a plurality of antenna ports configured to receive downlink signals from a base station;
   a plurality of receiver circuits each coupled to a respective one of the plurality of antenna ports and configured to process the received downlink signals;
   a quality estimation unit to estimate a quality of the received downlink signals,
   wherein the quality estimation unit comprises a plurality of SIR estimators, and wherein each of the receiver circuits is coupled to a respective one of the plurality of SIR estimators;
   a power loop controller configured to generate transmit power control commands based on the estimated quality of the received downlink signals, the transmit power control commands configured to adjust a power of the downlink signals generated by the base station,
   wherein the power loop controller comprises a plurality of TPC determinators, wherein each of the TPC determinators is coupled to a respective one of the plurality of SIR estimators,
   wherein each of the plurality of TPC determinators is configured to determine a transmit power control command based on the SIR value estimated by the SIR estimator coupled to the respective TPC determinator;

a diversity controller configured to selectively activate and deactivate one or more of the receiver circuits based on the estimated quality of the received downlink signals; and a switch coupled between the plurality of TPC determinators and the transmitter and configured to transfer at least one of the transmit power control commands determined by the respective TPC determinator to the transmitter.

9. The user equipment of claim 8, wherein the switch is controlled by the diversity controller.

10. A user equipment, comprising:
a plurality of antenna ports configured to receive downlink signals from a base station;
a plurality of receiver circuits each coupled to a respective one of the plurality of antenna ports and configured to process the received downlink signals;
a quality estimation unit to estimate a quality of the received downlink signals;
a power loop controller configured to generate transmit power control commands based on the estimated quality of the received downlink signals, the transmit power control commands configured to adjust a power of the downlink signals generated by the base station; and
a diversity controller configured to selectively activate and deactivate one or more of the receiver circuits based on the estimated quality of the received downlink signals,
wherein the diversity controller is configured to detect a high-windup situation or an out-of-sync situation, or both, and
wherein the diversity controller is configured to activate at least one of the receiver circuits upon detecting a start of the high-windup or out-of-sync situation.

11. The user equipment of claim 10, wherein the diversity controller is configured to deactivate at least one of the activated receiver circuits upon detecting an end of the high-windup or out-of-sync situation.

12. A user equipment, comprising:
a plurality of antenna ports configured to receive downlink signals from a base station;
a plurality of receiver circuits each coupled to a respective one of the plurality of antenna ports and configured to process the received downlink signals;
a quality estimation unit to estimate a quality of the received downlink signals;
a power loop controller configured to generate transmit power control commands based on the estimated quality of the received downlink signals, the transmit power control commands configured to adjust a power of the downlink signals generated by the base station; and
a diversity controller configured to selectively activate and deactivate one or more of the receiver circuits based on the estimated quality of the received downlink signals,
wherein the diversity controller is configured to detect a high-windup situation or an out-of-sync situation, or both, and
wherein the diversity controller is configured to detect a start of the high-windup situation by comparing a difference between the SIR values and target SIR values against a threshold.

13. A user equipment, comprising:
a plurality of antenna ports configured to receive downlink signals from a base station;
a plurality of receiver circuits each coupled to a respective one of the plurality of antenna ports and configured to process the received downlink signals;
a quality estimation unit to estimate a quality of the received downlink signals;
a power loop controller configured to generate transmit power control commands based on the estimated quality of the received downlink signals, the transmit power control commands configured to adjust a power of the downlink signals generated by the base station; and
a diversity controller configured to selectively activate and deactivate one or more of the receiver circuits based on the estimated quality of the received downlink signals,
wherein the diversity controller is configured to detect a high-windup situation or an out-of-sync situation, or both, and
wherein the diversity controller is configured to detect a start of the out-of-sync situation by comparing a quality measure based on transmit power control commands against a threshold.

14. A user equipment, comprising:
a plurality of antenna ports configured to receive downlink signals from a base station;
a plurality of receiver circuits each coupled to a respective one of the plurality of antenna ports and configured to process the received downlink signals;
a quality estimation unit to estimate a quality of the received downlink signals;
a power loop controller configured to generate transmit power control commands based on the estimated quality of the received downlink signals, the transmit power control commands configured to adjust a power of the downlink signals generated by the base station; and
a diversity controller configured to selectively activate and deactivate one or more of the receiver circuits based on the estimated quality of the received downlink signals,
wherein the diversity controller is configured to detect a high-windup situation or an out-of-sync situation, or both,
wherein the diversity controller comprises a first timer which is started upon detection of a start of the high-windup or the out-of-sync situation, and
wherein the diversity controller detects an end of the high-windup or the out-of-sync situation when the first timer expires.

15. A user equipment, comprising:
a plurality of antenna ports configured to receive downlink signals from a base station;
a plurality of receiver circuits each coupled to a respective one of the plurality of antenna ports and configured to process the received downlink signals;
a quality estimation unit to estimate a quality of the received downlink signals;
a power loop controller configured to generate transmit power control commands based on the estimated quality of the received downlink signals, the transmit power control commands configured to adjust a power of the downlink signals generated by the base station; and
a diversity controller configured to selectively activate and deactivate one or more of the receiver circuits based on the estimated quality of the received downlink signals,
wherein the diversity controller is configured to detect a high-windup situation or an out-of-sync situation, or both,
wherein the diversity controller is configured to switch during a high-windup or an out-of-sync situation between a first state and a second state,
wherein in the first state the power loop controller is configured to generate the transmit power control commands based on SIR values of downlink signals received by at least two activated receiver circuits, and wherein in the second state the power loop controller is configured the transmit power control commands based on SIR values of downlink signals received by one of at least two activated receiver circuits.

16. The user equipment of claim 15, wherein the one of the at least two activated receiver circuits is the receiver circuit that receives downlink signals with maximum signal-to-interference-and-noise ratio.

17. The user equipment of claim 15, wherein the diversity controller comprises a second timer configured to determine a length of the first state and a third timer configured to determine a length of the second state.

18. A user equipment, comprising:
- a plurality of antenna ports configured to receive downlink signals from a base station;
- a plurality of receiver circuits each coupled to a respective one of the plurality of antenna ports configured to process the received downlink signals;
- a transmitter configured to transmit uplink signals directed to the base station;
- a power loop controller configured to adjust a power of the uplink signals based on transmit power control commands included in the downlink signals, wherein the power loop controller is configured to turn the transmitter off if the quality measure falls below a first threshold value;
- a TPC quality estimator configured to estimate a quality measure of the transmit power control commands; and
- a diversity controller configured to selectively activate and deactivate one or more of the receiver circuits based on the estimated quality measure.

19. The user equipment of claim 18, wherein the power loop controller is configured to turn the transmitter on if the quality measure exceeds a second threshold value.

20. A method for downlink power control of a user equipment comprising a plurality of antenna ports and a plurality of receiver circuits each coupled to a respective one of the plurality of antenna ports, the method comprising:
- receiving downlink signals from a base station by the plurality of antenna ports;
- processing the received downlink signals by the plurality of receiver circuits;
- estimating a quality of the received downlink signals, wherein estimating the quality of the received downlink signals comprises estimating signal-to-interference-and-noise ratio (SIR) values of transmission power control (TPC) symbols or of pilot symbols and TPC symbols comprised in the downlink signals;
- selectively activating and deactivating one or more of the receiver circuits based on the estimated quality of the received downlink signals; and
- generating transmit power control commands based on the estimated quality of the received downlink signals, the transmit power control commands configured to adjust a power of the downlink signals generated by the base station.

21. A method for uplink power control of a user equipment comprising a plurality of antenna ports and a plurality of receiver circuits each coupled to a respective one of the plurality of antenna ports, the method comprising:
- receiving downlink signals from a base station by the plurality of antenna ports;
- processing the received downlink signals by the plurality of receiver circuits;
- estimating a quality measure of transmit power control commands included in the downlink signals;
- selectively activating and deactivating one or more of the receiver circuits based on the estimated quality measure; and
- adjusting a power of uplink signals directed to the base station based on the transmit power control commands,
- wherein a power of the uplink signals is turned off if the quality measure falls below a first threshold value and is turned on if the quality measure exceeds a second threshold value.

* * * * *